United States Patent
Ahn et al.

(10) Patent No.: US 12,218,382 B2
(45) Date of Patent: Feb. 4, 2025

(54) BATTERY PACK

(71) Applicant: Samsung SDI Co., Ltd., Yongin-si (KR)

(72) Inventors: Byungkook Ahn, Yongin-si (KR); Sangmyeong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/517,373

(22) Filed: Nov. 2, 2021

(65) Prior Publication Data
US 2022/0140449 A1    May 5, 2022

(30) Foreign Application Priority Data
Nov. 2, 2020    (KR) .................. 10-2020-0144582

(51) Int. Cl.
| | |
|---|---|
| *H01M 50/512* | (2021.01) |
| *H01M 50/213* | (2021.01) |
| *H01M 50/503* | (2021.01) |
| *H01M 50/507* | (2021.01) |

(52) U.S. Cl.
CPC ....... *H01M 50/512* (2021.01); *H01M 50/213* (2021.01); *H01M 50/503* (2021.01); *H01M 50/507* (2021.01)

(58) Field of Classification Search
CPC ............. H01M 50/512; H01M 50/507; H01M 50/503; H01M 50/213
See application file for complete search history.

(56) References Cited

U.S. PATENT DOCUMENTS

| | | | |
|---|---|---|---|
| 10,720,626 | B2 | 7/2020 | Harris et al. |
| 10,950,912 | B2 | 3/2021 | Elfering et al. |
| 2012/0135296 | A1 | 5/2012 | Itoi et al. |
| 2014/0154541 | A1* | 6/2014 | Asakura .............. H01M 50/367 429/82 |
| 2017/0018750 | A1 | 1/2017 | Wintner |
| 2017/0256770 | A1* | 9/2017 | Wynn ................. H01M 50/213 |

(Continued)

FOREIGN PATENT DOCUMENTS

| | | |
|---|---|---|
| CN | 111063855 A | 4/2020 |
| JP | 2018-116775 A | 7/2018 |

(Continued)

OTHER PUBLICATIONS

International Search Report for corresponding International Application No. PCT/KR2021/015727, dated Feb. 16, 2022 (3 pages).

(Continued)

*Primary Examiner* — Matthew T Martin
*Assistant Examiner* — Taylor Harrison Krone
(74) *Attorney, Agent, or Firm* — Lewis Roca Rothgerber Christie LLP

(57) ABSTRACT

A battery pack includes: a plurality of battery cells arranged in rows that are parallel with a first axis, wherein the battery cells arranged in the rows adjacent to each other in a second axis crossing the first axis are forwardly or backwardly misaligned with each other with respect to the first axis; and a plurality of bus bars having a zigzag shape and forming a plurality of parallel modules by connecting corresponding ones of the battery cells arranged in the second axis in parallel.

17 Claims, 13 Drawing Sheets

(56) References Cited

U.S. PATENT DOCUMENTS

| | | | |
|---|---|---|---|
| 2019/0348661 A1* | 11/2019 | Bae | H01M 50/213 |
| 2020/0067060 A1 | 2/2020 | Collins et al. | |
| 2021/0036300 A1 | 2/2021 | Bae | |
| 2023/0020610 A1* | 1/2023 | Lim | H01M 10/425 |

FOREIGN PATENT DOCUMENTS

| | | |
|---|---|---|
| KR | 10-2012-0046224 A | 5/2012 |
| KR | 10-2018-0129115 A | 12/2018 |
| KR | 10-1977454 B1 | 5/2019 |
| KR | 10-2019-0092588 A | 8/2019 |
| KR | 10-2019-0093008 A | 8/2019 |
| KR | 10-2020-0007101 A | 1/2020 |

OTHER PUBLICATIONS

EPO Extended European Search Report dated Sep. 2, 2024, issued in corresponding European Patent Application No. 21886983.2 (8 pages).

Korean Notice of Allowance dated Nov. 21, 2024, issued in corresponding Korean Patent Application No. 10-2020-0144582 (2 pages).

* cited by examiner

BATTERY PACK

CROSS-REFERENCE TO RELATED APPLICATION

The present application claims priority to and the benefit of Korean Patent Application No. 10-2020-0144582, filed on Nov. 2, 2020, in the Korean Intellectual Property Office, the entire disclosure of which is incorporated herein by reference.

BACKGROUND

1. Field

Aspects of some embodiments of the present disclosure relate to a battery pack.

2. Description of the Related Art

Generally, a secondary battery is a battery that may be repeatedly recharged and discharged, as opposed a primary battery that is generally not rechargeable. A secondary battery may be used as an energy source of a mobile device, an electric vehicle, a hybrid vehicle, an electric bicycle, an uninterruptible power supply, etc. and may be used in the form of a single battery or as a module in which a plurality of batteries are grouped in a unit, according to a type of an external device to which the secondary battery is applied.

The above information disclosed in this Background section is only for enhancement of understanding of the background and therefore the information discussed in this Background section does not necessarily constitute prior art.

SUMMARY

Aspects of one or more embodiments include a battery pack having a relatively improved connection structure electrically connecting different battery cells.

Additional aspects will be set forth in part in the description which follows and, in part, will be apparent from the description, or may be learned by practice of the presented embodiments of the disclosure.

According to some embodiments, a battery pack includes: a plurality of battery cells arranged in a plurality of rows that are parallel with a first axis, wherein the battery cells arranged in the rows adjacent to each other in a second axis crossing the first axis are forwardly or backwardly misaligned with each other with respect to the first axis; and a bus bar extending to have a zigzag shape between adjacent parallel modules to form a plurality of parallel modules by connecting the battery cells arranged in the second axis in parallel.

According to some embodiments, the bus bar may include a first contact side and a second contact side respectively arranged on a first line and a second line that are parallel with the second axis and apart from each other in the first axis and a connection side extending in the first axis to connect the first and second contact sides with each other.

According to some embodiments, the first and second contact sides may be alternately arranged with each other in the second axis.

According to some embodiments, the first and second contact sides may be forwardly or backwardly misaligned with each other between the adjacent parallel modules.

According to some embodiments, the bus bar may further include a third contact side arranged on a third line parallel with the second axis and apart from the first and second lines in the first axis.

According to some embodiments, the first through third lines may be sequentially located in the order of a forward location then a backward location with respect to the first axis, and the first through third contact sides may be sequentially arranged in the order of the forward location then the backward location with respect to the first axis.

According to some embodiments, the bus bar including the third contact side may be forwardly or backwardly biased toward the third line, and the adjacent parallel modules with the bus bar therebetween may include an arrangement of the battery cells having a forwardly or backwardly biased shape toward the third line.

According to some embodiments, the bus bar may include the first through third contact sides in an edge location of the second axis, but may not include the third contact side in a central location of the second axis.

According to some embodiments, the bus bar may include the first and second contact sides in the central location of the second axis.

According to some embodiments, the battery pack may further include a connection member for connecting the battery cells with the bus bar.

According to some embodiments, the connection member may connect a first electrode and a second electrode of a first parallel module and a second parallel module that are adjacent to each other, the first electrode and the second electrode being different from each other, to the bus bar between the adjacent first and second parallel modules.

According to some embodiments, a distance between the first electrode and the bus bar may be different from a distance between the second electrode and the bus bar.

According to some embodiments, a distance between a first connection point of the connection member, connected to the first electrode, and a central connection point of the connection member, connected to the bus bar, may be different from a distance between a second connection point of the connection member, connected to the second electrode, and the central connection point of the connection member, connected to the bus bar.

According to some embodiments, the connection member may connect the first electrode of the first parallel module to the bus bar and connect the second electrode of the second parallel module to the bus bar.

According to some embodiments, the connection member may include first and second connection points forming connections with the adjacent first and second parallel modules, respectively, and a central connection point forming a connection with the bus bar between the first and second connection points.

According to some embodiments, the first and second connection points and the central connection point may be provided by different connection members including a first connection member and a second connection member.

According to some embodiments, the central connection point may include a first central connection point provided by the first connection member providing the first connection point and a second central connection point provided by the second connection member providing the second connection point, and the first and second central connection points may not be connected to each other by the first and second connection members.

According to some embodiments, the first and second connection points and the central connection point may be provided by one connection member.

According to some embodiments, the central connection point may include a third central connection point through which the one connection member providing the first and second connection points is connected to the bus bar.

According to some embodiments, the third central connection point may be provided as two or more third central connection points between the first and second connection points.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
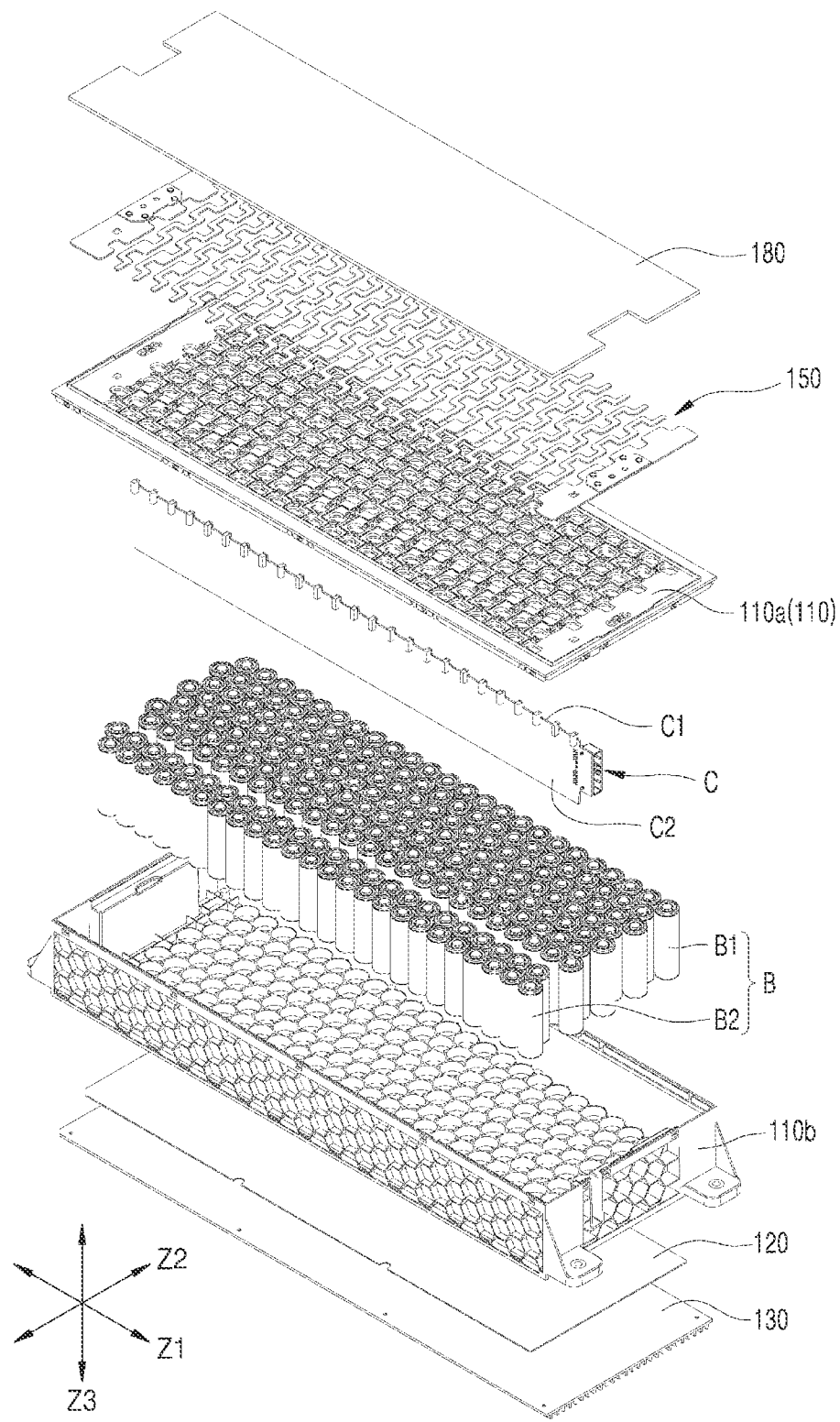
FIG. 1 is an exploded perspective view of a battery pack according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack according to some embodiments is described with reference to the accompanying drawings.

Figure 2:
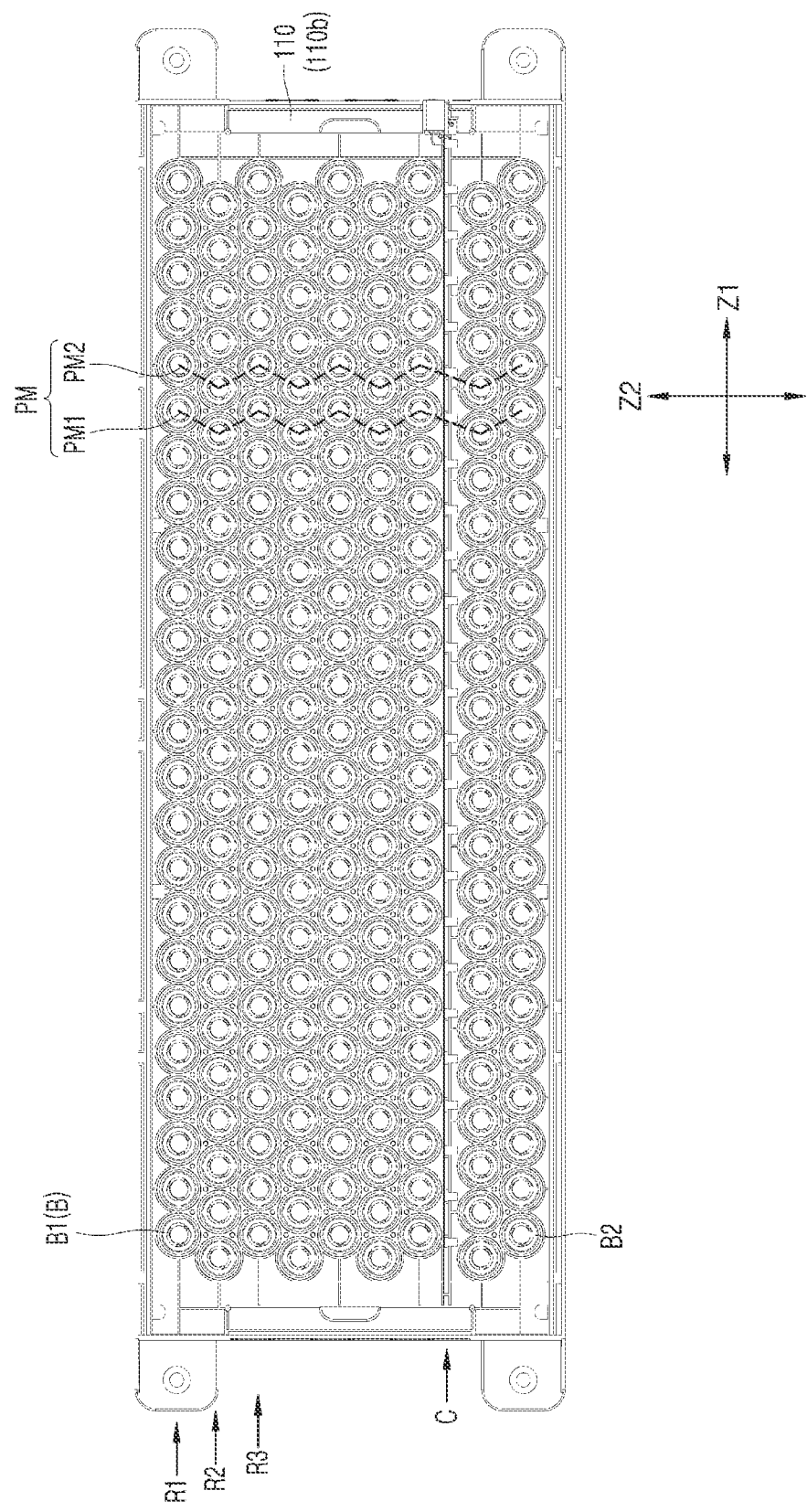
FIG. 2 is a view of an arrangement of battery cells illustrated in FIG. 1.
Figure 3:
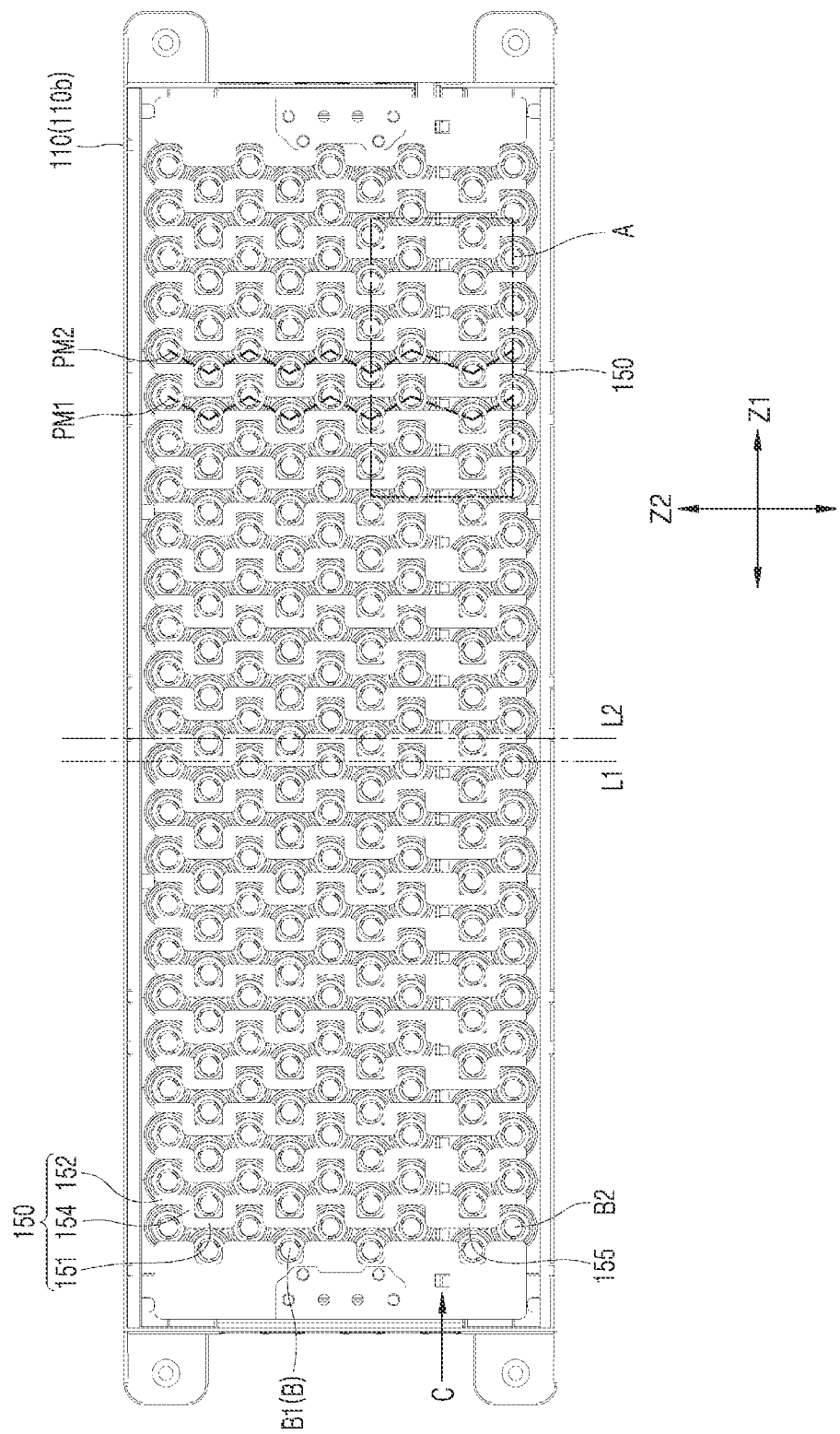
FIGS. 3 through 5 are different views of a connection of the battery cells illustrated in FIG. 2.
Figure 4:
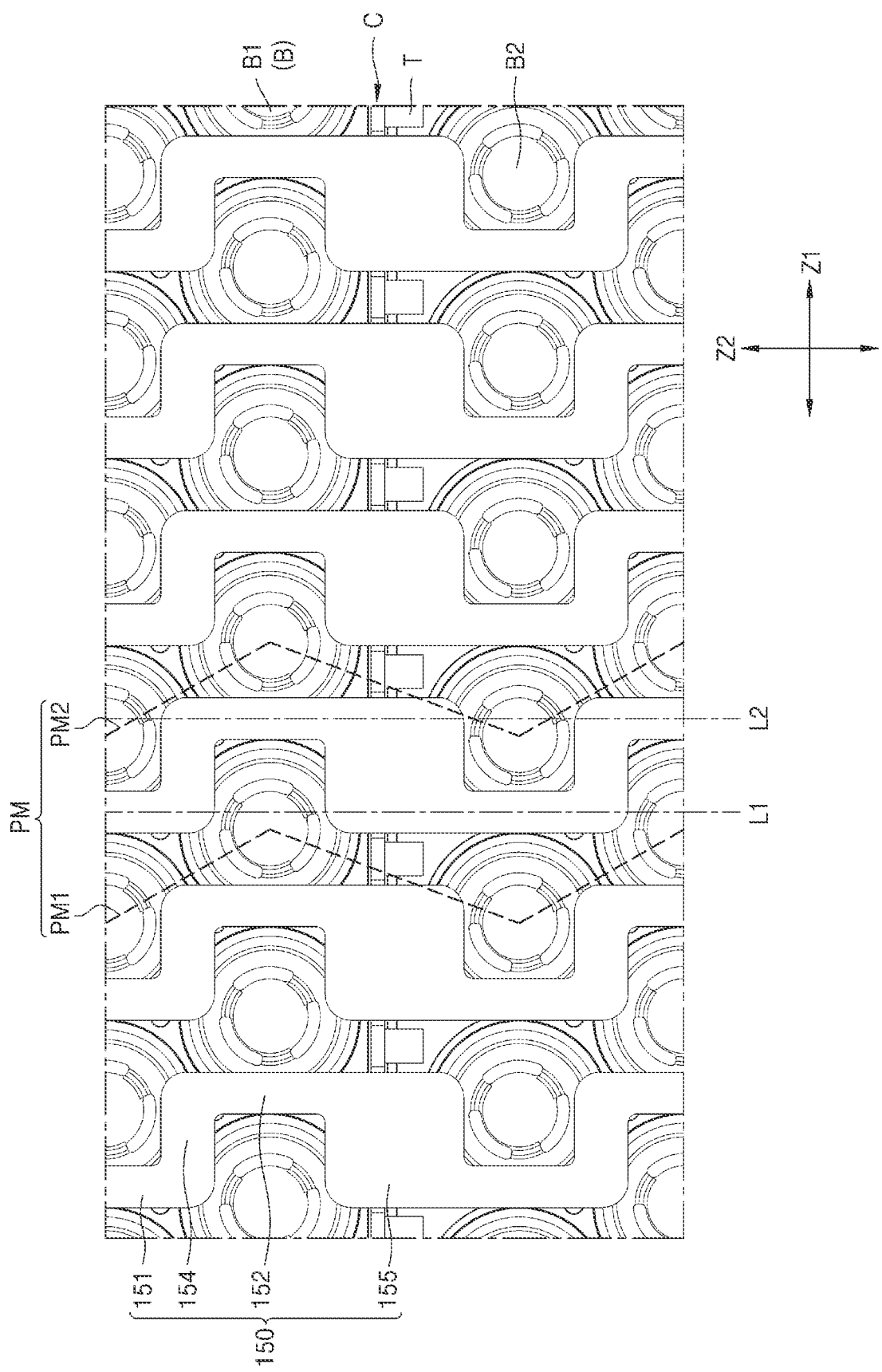
Figure 5:
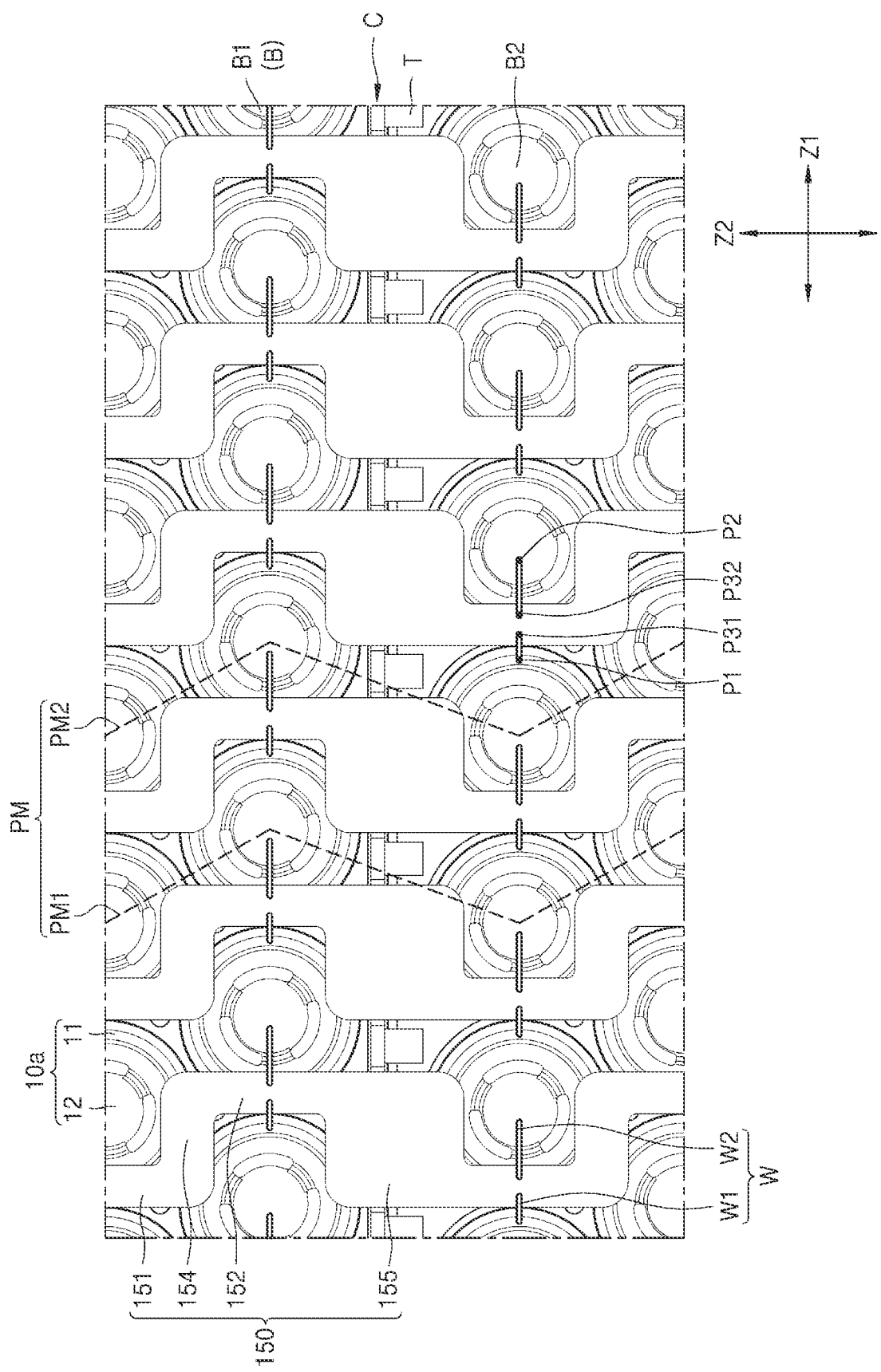
Figure 6:
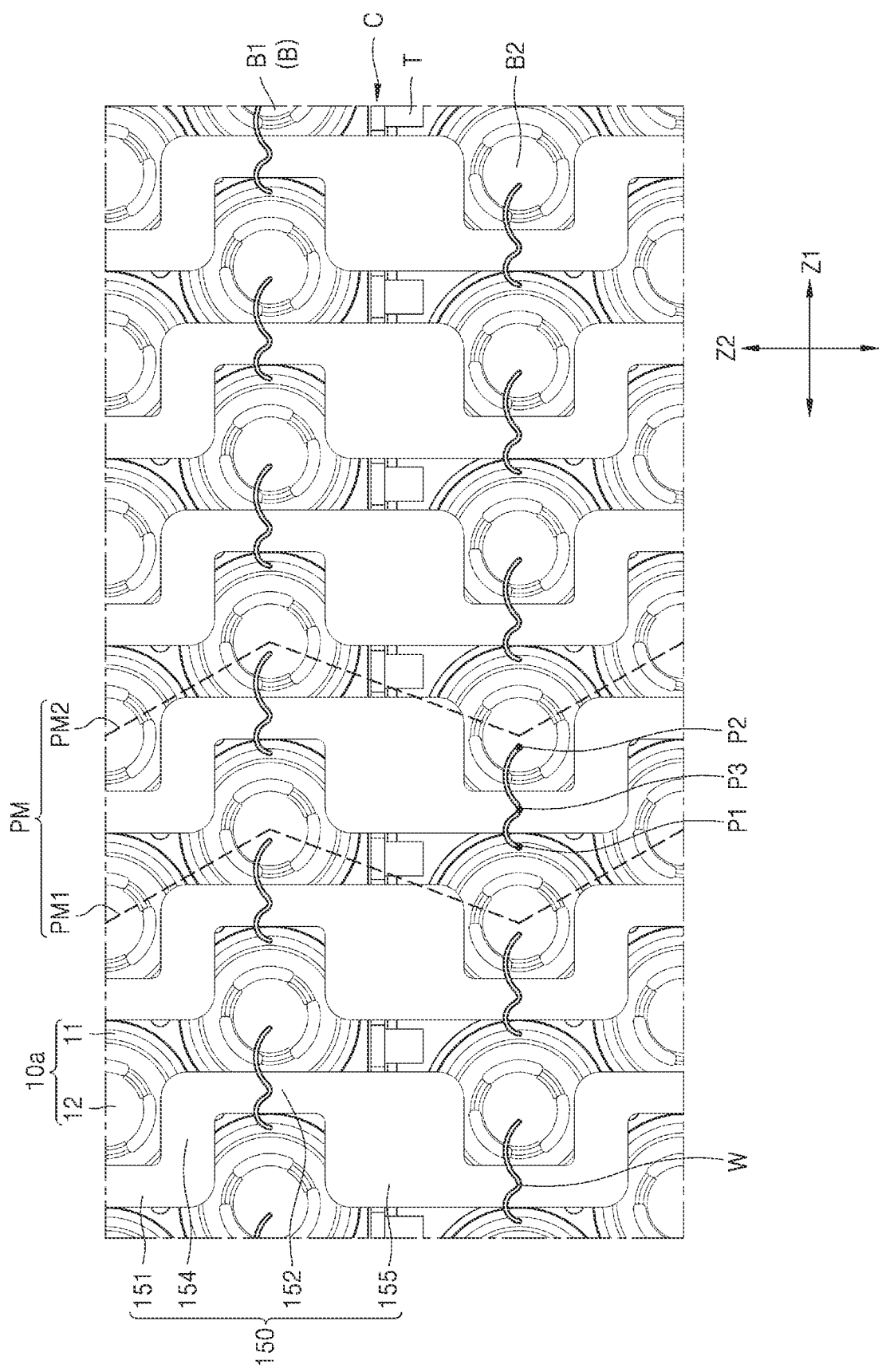
FIG. 6 is a view of the connection of the battery cells of FIG. 5, according to some embodiments.

FIG. 1 is an exploded perspective view of a battery pack according to some embodiments. FIG. 2 is a view of an arrangement of battery cells illustrated in FIG. 1. FIGS. 3 through 5 are views of a connection of the battery cells illustrated in FIG. 2. FIG. 6 is a view of the connection of the battery cells of FIG. 5, according to some embodiments.

Referring to FIGS. 1 through 5, the battery pack according to some embodiments may include a circuit substrate C arranged between a group of first battery cells B1 and a group of second battery cells B2. According to some embodiments, the group of first battery cells B1 may include a plurality of first battery cells B1 arranged on a first surface C1 side of the circuit substrate C, in a row in a first axis Z1 in which the circuit substrate C extends. Similarly, the group of second battery cells B2 may include a plurality of second battery cells B2 arranged on a second surface C2 side of the circuit substrate C, in a row in the first axis Z1 in which the circuit substrate C extends. Here, the circuit substrate C may include the first and second surfaces C1 and C2 that are opposite to each other, and the first and second surfaces C1 and C2 of the circuit substrate C may denote main surfaces occupying most of the area of the circuit substrate C. Also, that the group of first battery cells B1 are arranged on the first surface C1 of the circuit substrate C may denote that the first battery cells B1 are arranged to directly face the first surface C1 between the first and second surfaces C1 and C2 of the circuit substrate C. Similarly, that the group of second battery cells B2 are arranged on the second surface C2 of the circuit substrate C may denote that the second battery cells B2 are arranged to directly face the second surface C2 between the first and second surfaces C1 and C2 of the circuit substrate C. That is, the first battery cells B1 and the second battery cells B2 may be arranged to be opposite to each other with the circuit substrate C therebetween.

The first and second battery cells B1 and B2 may be arranged to be opposite to each other based on the circuit substrate C but may have substantially the same or similar arrangement structure and substantially the same or similar electrical connection structure to each other. As described below, the first and second battery cells B1 and B2 may be connected in a parallel fashion by one bus bar 150 extending across the circuit substrate C (e.g., in a direction perpendicular to the extension direction of the circuit substrate C) and may form one parallel module PM, and the first and second battery cells B1 and B2 may not separately form the parallel module PM based on a separately formed bus bar. Throughout the specification, that a plurality of battery cells B form one parallel module PM may denote that the first and second battery cells B1 and B2, which are included in the plurality of battery cells B, may be connected in a parallel fashion by one bus bar 150 extending across the circuit substrate C and may form one parallel module PM. Hereinafter, the battery cells B may denote either of the first battery cells B1 and the second battery cells B2 or both of the first battery cells B1 and the second battery cells B2.

According to some embodiments, the battery cells B may include the first battery cells B1 and the second battery cells B2 arranged to be opposite to each other relative to the circuit substrate C. However, according to various embodiments, the battery cell B may include only the first battery cells B1 arranged on a side of the circuit substrate C and may not include the second battery cells B2 arranged on the other side of the circuit substrate C. Even in this case, technical configurations described hereinafter may be applied in substantially the same manner or a similar manner. For example, an arrangement structure or an electrical connection structure of the battery cells B, described hereinafter, may be applied, in substantially the same or similar manner, to the battery cells B arranged in a plurality of rows, regardless of a presence of the circuit substrate C or the location of the circuit substrate C.

Referring to FIGS. 1 through 5, the battery cells B may be arranged in a plurality of rows parallel with the first axis Z1, and the battery cells B arranged in adjacent rows may be forwardly or backwardly misaligned with each other with respect to the first axis Z1. For example, the battery cells B may include the plurality of rows of the battery cells B, each arranged in a row in the first axis Z1, and the battery cells B of each of the rows may be arranged to be parallel with the first axis Z1. Here, throughout the specification, the first axis Z1 may denote a row direction of the battery cells B, and the plurality of battery cells B may be arranged in a row from a forward location to a backward location in the first axis Z1. The battery cells B in rows adjacent to each other in a second axis Z2 crossing the first axis Z1 may be misaligned (e.g., laterally offset in a plan view relative to the second axis Z2) with each other with respect to the first axis Z1. For example, with respect to the battery cells B of a first row R1 and a second row R2 adjacent to each other, the battery cells B of the first rows R1 and the battery cells B of the second row R2 may be forwardly or backwardly misaligned or offset with each other with respect to the first axis Z1. That is, the battery cells B of the first row R1 may be forwardly or backwardly misaligned or offset with the second row R2 along the first axis Z1, and thus, the battery cells B of the first and second rows R1 and R2 may be inserted into the valley area or contour of battery cells B the other row. For example, the battery cells B of the first and second rows R1 and R2 may be arranged in valley areas between each other to reduce dead spaces, and thus, a plurality of battery cells B may be tightly and densely arranged in a limited area, enabling a formation of a compact structure.

Because the battery cells B in the adjacent rows may be alternately forwardly and backwardly misaligned or offset with each other with respect to the first axis Z1, the battery cells B may be arranged to have a zigzag shape with respect to the second axis Z2. For example, when the battery cells B of the first row R1, the battery cells B of the second row R2, and the battery cells B of a third row R3 are arranged to be adjacent to each other, with respect to the battery cells B in the second row R2, the battery cells B in the first row R1 may be relatively backwardly arranged, and with respect to the battery cells B in the second row R2, the battery cells B in the third row R3 may also be relatively backwardly arranged. As described above, because the battery cells B in the first through third rows R1 through R3 adjacent to each other may be alternately forwardly and backwardly misaligned with each other, the battery cells B may be arranged to have a zigzag shape with respect to the second axis Z2. As described below, the battery cells B arranged to have the zigzag shape in the second axis Z2 may be connected with each other in parallel and may form the parallel module PM. Throughout the specification, that the battery cells B may be arranged to have the zigzag shape with respect to the second axis Z2 may not denote that the battery cells B may be arranged on a straight line in the second axis Z2. Rather, it may denote that although the battery cells B are not arranged to be parallel with the second axis Z2, the battery cells B may be arranged to be approximately parallel with the second axis Z2, for example, in a zigzag direction misaligned at an acute angle with respect to the second axis Z2. Throughout this specification, the second axis Z2 may denote a direction crossing the first axis Z1, and according to some embodiments, the second axis Z2 may denote a direction vertically crossing the first axis Z1.

According to some embodiments, the plurality of battery cells B arranged in a zigzag shape along the second axis Z2 may form one parallel module PM, in which the plurality of battery cells B are connected with each other in parallel. Also, parallel modules PM adjacent to each other in the first axis Z1 may be connected in series. For example, according to some embodiments, the first axis Z1 may correspond to a serial connection direction, and the second axis Z2 may correspond to a parallel connection direction. Here, the parallel connection direction may denote a direction in which the plurality of battery cells B arranged to have the zigzag shape with respect to the second axis Z2 are connected in parallel, and the parallel modules PM connected with each other in parallel may form the parallel connection in a direction approximately parallel with the second axis Z2.

According to some embodiments, different battery cells B included in the same parallel module PM may form the parallel connection, as the same polarities of the different battery cells B are connected with each other, and different battery cells B included in different parallel modules PM, for example, adjacent parallel modules PM, may form a serial connection, as different polarities of the different battery cells B are connected with each other.

For example, the different battery cells B included in the same parallel module PM may be connected in parallel with each other, as the same polarities thereof are connected with each other. Also, the different battery cells included in the adjacent parallel modules PM may be connected in series with each other, as the different polarities thereof connected with each other. According to some embodiments, with respect to the parallel connection and the serial connection of the battery cells B, the parallel connection may be formed, as the same polarities of the different battery cells B are connected to the same bus bar 150, and the serial connection may be formed, as the different polarities of the different battery cells B are connected to the same bus bar 150.

For example, the parallel connection between the different battery cells B may be formed as a connection member W (see FIG. 5) mediating a connection between the battery cells B and the bus bar 150 connects the same polarities of the different battery cells B to the same bus bar 150, and the serial connection between the different battery cells B may be formed as the connection member W (see FIG. 5) mediating a connection between the battery cells B and the bus bar 150 connects the different polarities of the different battery cells B to the same bus bar 150.

According to some embodiments, the bus bar 150 may extend between the adjacent parallel modules PM and may extend to have a bent shape in the first and second axes Z1 and Z2 crossing each other. According to some embodiments, the parallel module PM may include the plurality of battery cells B arranged to have the zigzag shape in the second axis Z2 and may extend to have a zigzag shape in the second axis Z2. Also, the bus bar 150 may extend between the adjacent parallel modules PM to have the bent shape with respect to the first and second axes Z1 and Z2 crossing each other. Here, that the bus bar 150 may be arranged between the adjacent parallel modules PM may not only denote that the bus bar 150 may be arranged between the adjacent parallel modules PM not to overlap the adjacent parallel modules PM, but may also denote that the bus bar 150 may be arranged between the adjacent parallel modules PM to overlap the adjacent parallel modules PM. According to some embodiments, the cell holder (see FIG. 1) may be arranged between the battery cells B and the bus bar 150 in a third axis Z3 corresponding to a longitudinal direction of the battery cells B, and thus, even when the battery cells B and the bus bar 150 facing each other with the cell holder 110 therebetween are arranged to partially overlap each other, the battery cells B and the bus bar 150 may not be short-circuited.

The bus bar 150 may include contact sides 151 and 152 extending in the second axis Z2 between the adjacent parallel modules PM and connected to the connection member W and a connection side 154 extending in the first axis Z1 between the contact sides 151 and 152 and connecting between the contact sides 151 and 152. The contact sides 151 and 152 may include a plurality of contact sides 151 and 152 alternately forwardly and backwardly arranged with respect to the second axis Z2. According to some embodiments, the contact sides 151 and 152 may include a plurality of first contact sides 151 arranged on a first line L1 that is parallel with the second axis Z2 and a plurality of second contact sides 152 arranged on a second line L2 that is parallel with the second axis Z2, and the first and second contact sides 151 and 152 may be connected to each other through the connection side 154. Here, the connection side 154 may extend in the first axis Z1 and may connect between ends of the first and second contact sides 151 and 152. According to some embodiments, the first and second contact sides 151 and 152 may extend on the first and second lines L1 and L2 that are parallel with the second axis Z2 and apart from each other with respect to the first axis Z1, and the first and second contact sides 151 and 152 may be alternately arranged in the second axis Z2.

The first and second contact sides 151 and 152 may be connected to each other with the connection side 154 therebetween, and the plurality of first and second contact sides 151 and 152 connected to each other with a plurality of connection sides 154 therebetween may form one bus bar 150. Also, the first and second contact sides 151 and 152 connected to each other so as to form one bus bar 150 may be arranged between first and second parallel modules PM1 and PM2 adjacent to each other. According to some embodiments, a group of first contact sides 151 and a group of second contact sides 152 connected to each other with a group of connection sides 154 therebetween, respectively, may be arranged between the adjacent first and second parallel modules PM1 and PM2.

The contact sides 151 and 152 may be arranged between the adjacent first and second parallel modules PM1 and PM2 and may serially connect the adjacent first and second parallel modules PM1 and PM2. For example, the connection member W (see FIG. 5) may be arranged between the contact sides 151 and 152 and the adjacent parallel modules PM and may serially connect the adjacent parallel modules PM. For example, an end (first and second connection points P1 and P2, see FIG. 5) of the connection member W may be connected to the adjacent first and second parallel modules PM1 and PM2, and the other end (central connection points P31 and P32, see FIG. 5) of the connection member W may be connected to the contact sides 151 and 152, and the adjacent parallel modules PM may be serially connected with each other through the contact sides 151 and 152. Here, the connection member W (see FIG. 5) may have the first and second connection points P1 and P2 at an end thereof connected to the battery cells B included in the first and second parallel modules PM1 and PM2 and the central connection points P31 and P32 at the other end thereof connected to the contact sides 151 and 152 of the bus bar 150.

Referring to FIGS. 5 and 6, according to various embodiments, the connection member W forming the first and second connection points P1 and P2 connected to the first and second parallel modules PM1 and PM2 and the central connection points P31 and P32 connected to the bus bar 150 may be formed as separate connection members W (see FIG. 5) or as the same connection member W (see FIG. 6). That is, the connection member W forming the first and second connection points P1 and P2 with the first and second parallel modules PM1 and PM2 may be formed as separate connection members W1 and W2 and may separately form the central connection points P31 and P32 (the first and second central connection points P31 and P32) with the bus bar 150 (see FIG. 5), or the connection member W forming the first and second connection points P1 and P2 with the first and second parallel modules PM1 and PM2 may be continually formed and may form one central connection point P3 (a third central connection point P3) with the bus bar 150 (see FIG. 6). This aspect will be described in more detail below.

Referring to FIG. 5, the first and second connection points P1 and P2 of the connection member W may be connected to different polarities of the adjacent first and second parallel modules PM1 and PM2. For example, the first connection point P1 may be connected to a first electrode 11 of the first parallel module PM1 (the battery cells B included in the first parallel module PM1), and the second connection point P2 may be connected to a second electrode 12 of the second parallel module PM2 (the battery cells B included in the second parallel module PM2). According to some embodiments, the first and second electrodes 11 and 12 of the battery cell B may be formed on different locations of an upper end portion 10a of the battery B. For example, the first electrode 11 may be formed on a boundary location of the upper end portion 10a, and the second electrode 12 may be formed on a central location of the upper end portion 10a surrounded by the first electrode 11. As described above, the first and second electrodes 11 and 12 to which the first and second connection points P1 and P2 are connected may be formed on the different locations from each other, and thus, a distance between the first connection point P1 and the first central connection point P31 may be different from a distance between the second connection point P2 and the second central connection point P32. For example, the bus bar 150 arranged between the adjacent first and second parallel modules PM1 and PM2 may be connected to the first connection point P1 connected to the first electrode 11 of the first parallel module PM1 and the second connection point P2 connected to the second electrode 12 of the second parallel module PM2, wherein the first connection point P1 connected to the first electrode 11 of the first parallel module PM1 may be formed to be relatively close to the bus bar 150, and the second connection point P2 connected to the second electrode 12 of the second parallel module PM2 may be formed to be relatively far from the bus bar 150.

Referring to FIG. 4, the contact sides 151 and 152 may include first and second contact sides 151 and 152 forwardly or backwardly misaligned with each other. With respect to this arrangement of the contact sides 151 and 152, the battery cells B in adjacent rows may be forwardly or backwardly misaligned with each other, and thus, the contact sides 151 and 152 of the bus bar 150 extending across the battery cells B in the adjacent rows may be alternately forwardly or backwardly arranged. The connection side 154 may connect the first and second contact sides 151 and 152 forwardly and backwardly deviate from each other between the adjacent parallel modules PM, that is, the first and second contact sides 151 and 152 respectively arranged on the first and second lines L1 and L2 forwardly or backwardly apart from each other in the first axis Z1. The connection side 154 may extend in the first axis Z1 and may connect the ends of the first and second contact sides 151 and 152 to each other.

Referring to FIG. 5, according to some embodiments, the connection member W may connect the different first and second electrodes 11 and 12 of the adjacent first and second parallel modules PM1 and PM2 with each other and may serially connect the first and second parallel modules PM1 and PM2 with each other. That is, the connection member W may form the first parallel module PM1 by connecting the first electrodes 11 of the battery cells B included in the first parallel module PM1 and may form the second parallel module PM2 by connecting the second electrodes 12 of the battery cells B included in the second parallel module PM2. Also, the connection member W may connect the first electrode 11 of the battery cell B included in the first parallel module PM1 with the second electrode 12 of the battery cell B included in the second parallel module PM2 and may serially connect the first and second parallel modules PM1 and PM2 with each other. Throughout this specification, that the connection member W may connect the first electrodes 11 of the different battery cells B with each other, may connect the second electrodes 12 of the different battery cells B with each other, or may connect the first and second electrodes 11 and 12 of the different battery cells B with each other may denote that the connection member W may connect the first electrodes 11 of the different battery cells B, may connect the second electrodes 12 of the different battery cells B, or may connect the first and second electrodes of the different battery cells B with each other, through the bus bar 150. For example, the connection member W may connect the first and second electrodes 11 and 12 to each other through the bus bar 150, rather than directly connecting the first and second electrodes 11 and 12 to each other. The connection member W include a metal strip-shaped wire or a metal strip-shaped ribbon.

The connection member W may form the first and second connection points P1 and P2 with the first and second parallel modules PM1 and PM2 (the first and second electrodes 11 and 12 of the battery cells B included in the first and second parallel modules PM1 and PM2) and may form the central connection points P31 and P32 with the bus bar 150. Here, each of the first and second connection points P1 and P2 and the central connection points P31 and P32 may be formed via wire bonding or ribbon bonding. In the wire bonding (or the ribbon bonding, hereinafter, the both are the same), an end of the connection member W may be compressed against the first and second electrodes 11 and 12 of the battery cells B, and thermal fusion may be performed by applying heat and/or vibration (e.g., set or predetermined heat and/or vibration) thereto, so as to form the first and second connection points P1 and P2, and similarly, the other end of the connection member W may be compressed against the bus bar 150 (the first and second contact sides 151 and 152), and thermal fusion may be performed by applying heat and/or vibration (e.g., predetermined heat and/or vibration) thereto, so as to form the central connection points P31 and P32.

For example, in the wire bonding, the first and second connection points P1 and P2 and the central connection points P31 and P32 may be formed together via a continual process. For example, a unit process in which the battery cell B or the bus bar 150 is compressed by the connection member W to which a bonding head for applying heat and pressure (e.g., set or predetermined heat and pressure) is continually provided may be continually performed, and thus, the first and second connection points P1 and P2 and the central connection points P31 and P32 may be continually formed together.

According to some embodiments as illustrated in FIG. 5, the first and second connection points P1 and P2 and the central connection points P31 and P32 may be formed by different connection members W. For example, first and second connection members W1 and W2 respectively forming the first and second connection points P1 and P2 may respectively form the second central connection points P31 and P32. Here, the first and second connection members W1 and W2 may not be continually connected and may be formed as separate members. In other words, the first connection member W1 or the second connection member W2 may not be formed between the first and second central connection points P31 and P32 formed by the first and second connection members W1 and W2, respectively, and the first and second central connection points P31 and P32 may not be connected to each other by the first connection member W1 or the second connection member W2. The first and second central connection points P31 and P32 may be separate connection points formed by temporally separate bonding processes. For example, the first and second central connection points P31 and P32 may be formed by wire bonding such that one may be formed earlier than the other, may not be simultaneously formed, and may be formed by temporally separate bonding processes to be apart from each other.

According to some embodiments as illustrated in FIG. 6, the first and second connection points P1 and P2 and the central connection points P31 and P32 may be formed by one connection member W. That is, the first and second connection points P1 and P2 and the third central connection point P3 may be formed by one continually formed connection member W. For example, the connection member W forming the first and second connection points P1 and P2 may form the third central connection point P3 with the bus bar 150. According to some embodiments, the connection member W forming the first and second connection points P1 and P2 may form the third central connection point P3 between the first and second connection points P1 and P2. Accordingly, the first and second connection points P1 and P2 and the third central connection point P3 may be formed by the continually formed connection member W. That is, the third central connection point P3 may be different from the first and second central connection points P31 and P32 (see FIG. 5) formed by the different connection members W1 and W2 respectively forming the first and second connection points P1 and P2 through the separate bonding processes. For example, the third central connection point P3 may denote a connection point formed by a single bonding process in wire bonding. According to various embodiments, the third central connection point P3 may include two or more central connection points formed between the first and second connection points P1 and P2, wherein the two or more third central connection points P3 may be continually connected to each other by one connection member W forming the first and second connection points P1 and P2.

As described above, because the first and second connection points P1 and P2 and the third central connection point P3 may be formed by one continually extending connection member W, the first and second connection points P1 and P2 and the third central connection point P3 may be continually bonded, and compared to the separate and intermittent bonding using the separate connection members W1 and W2

(see FIG. 5), the process may become more convenient, and the process time and manufacturing cost may be reduced.

Figure 7:
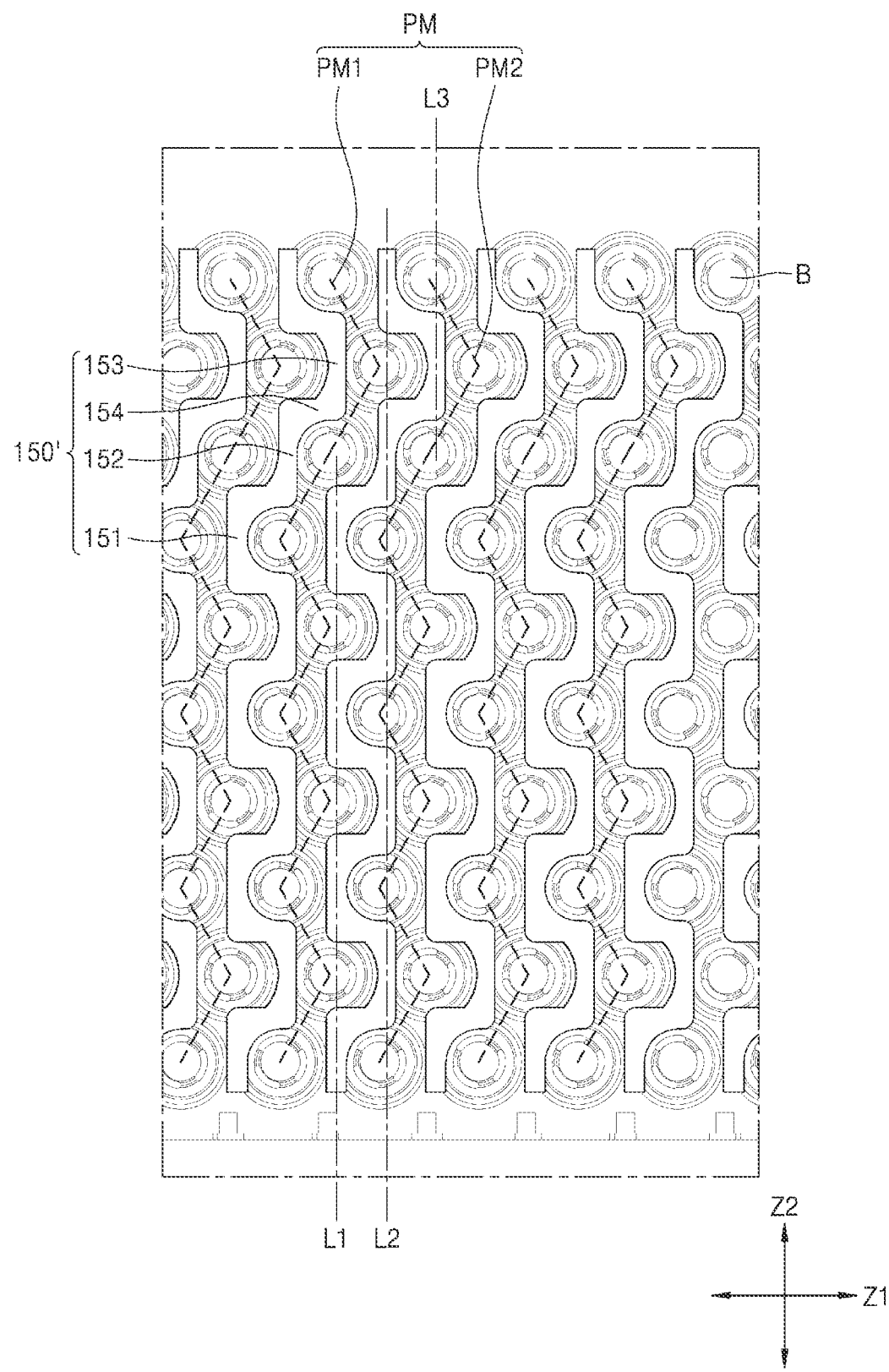
FIG. 7 is a view of the connection of the battery cells of FIG. 4, according to some embodiments.

According to some embodiments as illustrated in FIG. 7, contact sides 151, 152, and 153 may further include a third contact side 153 arranged on a third line L3 parallel with the second axis Z2, together with the first and second contact sides 151 and 152 respectively arranged on the first and second lines L1 and L2 parallel with the second axis Z2. Here, the first through third lines L1 through L3 may denote different lines extending in the second axis Z2 to be forwardly or backwardly apart from each other in the first axis Z1. According to some embodiments, the first through third lines L1 through L3 may be sequentially located in the order of a forward location then a backward location, and thus, the first through third contact sides 151 through 153 may be sequentially arranged in the order of a forward location then a backward location. For example, the first through third contact sides 151 through 153 may be arranged in the order of the first connection side 151, the second connection side 152, the third contact side 153, the second connection side 152, then the first connection side 151, in the second axis Z2.

The first through third contact sides 151 through 153 may be connected to each other by the connection side 154 extending in the first axis Z1 and connecting ends of the first through third contact sides 151 through 153 to each other, and the first through third contact sides 151 through 153 may form one bus bar 150'. For example, the connection side 154 may connect between the first and second contact sides 151 and 152 and between the second and third contact sides 152 and 153. A group of first contact sides 151, a group of second contact sides 152, and a group of third contact sides 153 connected to each other with a group of connection sides 154 therebetween so as to form one bus bar 150' may be arranged between the adjacent first and second parallel modules PM1 and PM2. That is, according to some embodiments, the bus bar 150' may include the first through third contact sides 151 through 153 arranged on the first through third lines L1 through L3 apart from each other in the first axis Z1. Here, as the bus bar 150 including the first and second contact sides 151 and 152 may be arranged between the adjacent first and second parallel modules PM1 and PM2 according to some embodiments as illustrated in FIG. 3, the bus bar 150' including the first through third contact sides 151 through 153 may be arranged between the adjacent first and second parallel modules PM1 and PM2.

The first and second parallel modules PM1 and PM2 arranged at both sides of the third contact side 153 (or the bus bar 150' including the third contact side 153) may include an arrangement of battery cells B that has an biased shape in a direction from the first line L1 toward the third line, for example, a backwardly biased shape. For example, the bus bar 150 illustrated in FIG. 3 may include the first and second contact sides 151 and 153 arranged on the first and second lines L1 and L2, respectively, but may not include the third contact side 135. Thus, the bus bar 150 may extend to generally have a bent shape with respect to the first contact side 151 in a forward location and the second contact side 152 in a backward location. Also, the bus bar 150 including the first and second contact sides 151 and 152 may extend to have a uniformly bent shape throughout the second axis Z2, that is, from an edge location of the second axis Z2 to a central location of the second axis Z2.

Unlike this, the bus bar 150' according to some embodiments may include the first through third contact sides 151 through 153 sequentially arranged in the order of the forward location then the backward location, and thus, the bus bar 150' including the first through third contact sides 151 through 153 may generally have a backwardly biased shape. However, according to some embodiments, the bus bar 150' may be selectively formed to have the backwardly biased shape by including the first through third contact sides 151 through 153 at the edge location of the second axis Z2, and the bus bar 150' may include the first and second contact sides 151 and 152 at the central location of the second axis Z2 and may not include the third contact side 153, so as not to be forwardly or backwardly biased at the central location. According to some embodiments, the bus bar 150' may be designed to be backwardly biased to avoid a heat dissipation structure arranged in the edge location of the second axis Z2, for example, a fluid passage or a pump for cooling the battery cells B, and the bus bar 150' may be backwardly biased along the parallel modules PM that are arranged to be backwardly biased to avoid the heat dissipation structure arranged in the edge location. That is, the bus bar 150' may be designed to be backwardly biased by including the first through third contact sides 151 through 153 at the edge location.

Figure 8:
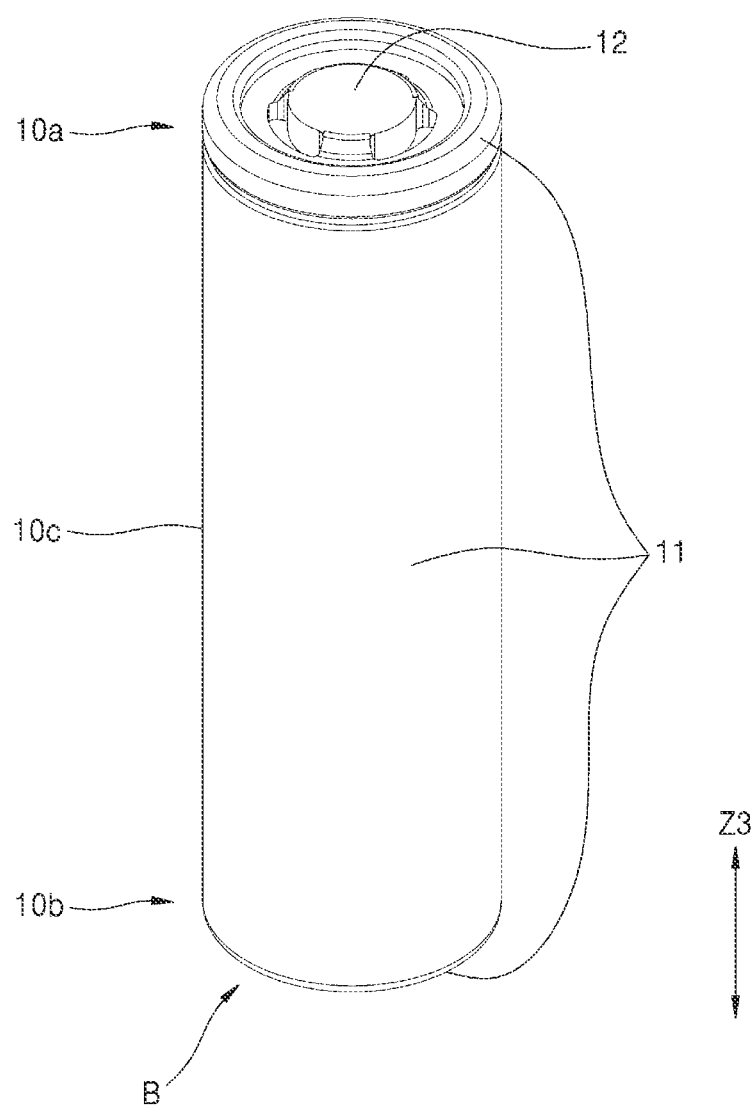
FIG. 8 is a perspective view of the battery cells illustrated in FIG. 1.
Figure 9:
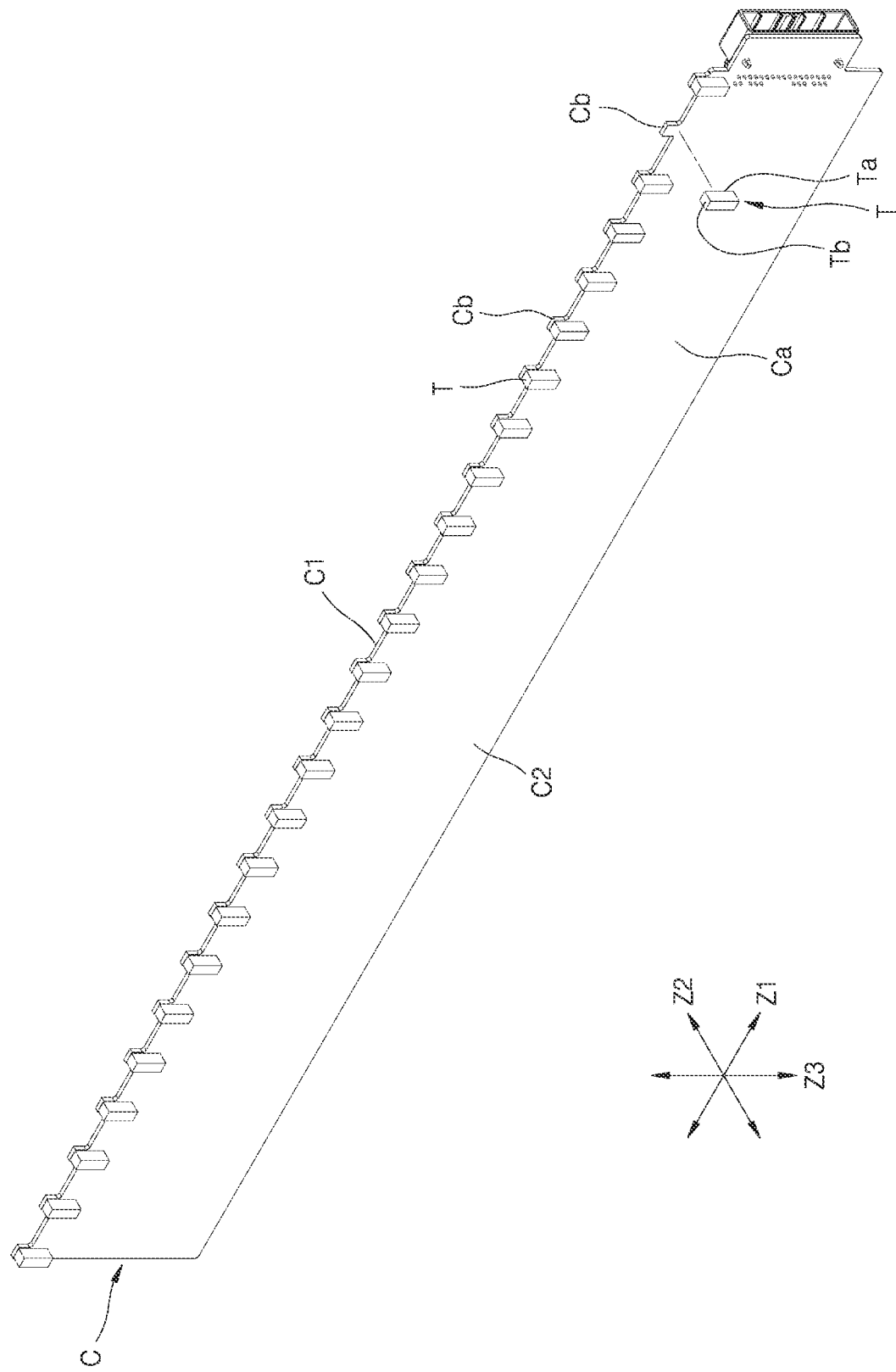
FIG. 9 is a perspective view of a circuit substrate illustrated in FIG. 1.

FIG. 8 is a perspective view of the battery cells B illustrated in FIG. 1. FIG. 9 is a perspective view of the circuit substrate C illustrated in FIG. 1.

Referring to FIG. 8, the battery cell B may extend in a third axis Z3 and may be formed as circular battery cells B. Here, the third axis Z3 may denote a direction crossing first and second axes Z1 and Z2, for example, a direction perpendicular to the first and second axes Z1 and Z2, and may denote a longitudinal direction in which the battery cells B extend.

The battery cells B may include an upper end portion 10a and a lower end portion 10b provided at both upper and lower ends along the third axis Z3 and having circular shapes, and a side surface 10c, which is a round outer circumferential surface between the upper end portion 10a and the lower end portion 10b. According to some embodiments, the battery cells B may include the first electrode 11 formed at a boundary location of the upper end portion 10a and the second electrode 12 formed at a central location of the upper end portion 10a. The first electrode 11 may extend from the boundary location of the upper end portion 10a to the lower end portion 10b through the side surface 10c. Here, both of the first electrode 11 at the boundary location and the second electrode 12 at the central location may be formed on the upper end portion 10a of the battery cells B, and the first electrodes 11 or the second electrodes 12 formed on the upper end portion 10a of the battery cells B may be connected to the same bus bar 150 in a parallel fashion through the connection member W connecting the upper end portion 10a of the battery cells B with the bus bar 150, so as to form the parallel module PM, and the first electrodes 11 and the second electrodes 12 formed on the upper end portion 10a of the battery cells B may be connected to the same bus bar 150 in a serial fashion, so as to form serial connection between adjacent parallel modules PM.

According to some embodiments as illustrated in FIG. 5, the plurality of battery cells B included in the same parallel module PM may form the parallel module PM as the same first electrodes 11 or the same second electrodes 12 are connected to the same bus bar 150. Also, different battery cells B included in the parallel modules PM adjacent in the first axis Z1 may be serially connected to each other as the different first and second electrodes 11 and 12 are connected to the same bus bar 150. Here, the connection member W mediating an electrical connection between the first and second electrodes 11 and 12 of the battery cells B and the bus bar 150 may be arranged therebetween. The connection member W may connect the same polarities of the different battery cells B to the same bus bar 150 to form a parallel connection and may connect the different polarities of the different battery cells B to the same bus bar 150 to form a serial connection.

According to some embodiments, the electrical connection of the battery cells B may be formed by the bus bar 150 arranged on the upper end portion 10a of the battery cells B, and the first and second electrodes 11 and 12 formed on the upper end portion 10a of the battery cells B may be electrically connected to each other through the bus bar 150. According to some embodiments, the electrical connection of the battery cells B may be formed through the upper end portion 10a of the battery cells B, and through the lower end portion 10b (shown, e.g., in FIG. 8) of the battery cells B, cooling of the battery cells B may be performed, rather than the electrical connection.

Referring to FIGS. 4 and 9, the circuit substrate C may be arranged between the group of first battery cells B1 and the group of second battery cells B2. The circuit substrate C may be arranged between the first and second battery cells B1 and B2 and may collect state information from the first and second battery cells B1 and B2. Also, the circuit substrate C may provide data for controlling a charging operation and a discharging operation of the first and second battery cells 1 and B2 from the state information collected from the first and second battery cells B1 and B2. According to some embodiments, the state information of the first and second battery cells B1 and B2 may include voltage information, temperature information, and current information of the first and second battery cells B1 and B2, or any other data or operating information about the first and second battery cells B1 and B2. According to some embodiments, the first and second battery cells B1 and B2 may be connected to each other in parallel by the same bus bar 150 extending across the circuit substrate C and may form the same parallel module PM. Thus, throughout this specification, receiving the voltage information of the first and second battery cells B1 and B2 may not denote separately receiving the voltage information from each of the first and second battery cells B1 and B2 and may rather denote simultaneously receiving the voltage information of each of the first and second battery cells B1 through the bus bar 150 connected to the first and second battery cells B1 and B2. As described below, a connection tap T protruding toward a first surface C1 or a second surface C2 may be formed on the circuit substrate C, and the connection tap T may be connected to each bus bar 150 forming the parallel module PM to receive the voltage information of the first and second battery cells B1 and B2 through the bus bar 150.

The circuit substrate C may include a base portion Ca and a tap mount portion Cb upwardly protruding in the third axis Z3 from the base portion Ca. The connection tap T mounted on a first surface C1 or a second surface C2 of the tap mount portion Cb may be formed on the tap mount portion Cb to be connected to the bus bar 150 forming the parallel module PM. The tap mount portion Cb may be included in the circuit substrate C. The first surface C1 or the second surface C2 of the tap mount portion Cb that is opposite to each other may correspond to the first surface C1 or the second surface C2 of the circuit substrate C that is opposite to each other. Hereinafter, that the connection tap T is formed on the first surface C1 or the second surface C2 of the circuit substrate C may denote that the connection tap T is formed on the first surface C1 or the second surface C2 of the tap mount portion Cb in the circuit substrate C.

The tap mount portion Cb may be formed in intermittent locations along an upper end portion of the circuit substrate C extending in the first axis Z1 and may be formed in locations crossing each bus bar 150 forming the parallel module PM and may be electrically connected to each bus bar 150. According to some embodiments, each bus par 150 forming the parallel module PM may extend approximately or generally along direction of the second axis Z2, and the tap mount portion Cb may be formed in the location crossing the bus 150 in the first axis Z1 and may receive voltage information of each bus bar 150 through the connection tap T mounted in the tap mount portion Cb. As described above, the tap mount portion Cb may be formed in the intermittent locations in the first axis Z1, and each may be generally formed to have the same length with the same distance therebetween. As described below, the tap mount portion Cb may be exposed to an upper holder 110a through a sensing hole 110s of the upper holder 110a, together with the connection tap T mounted in the tap mount portion Cb, and the connection tap T exposed to the upper holder 110a may be electrically connected to the bus bar 150 arranged on the upper holder 110a.

The connection tap T may be formed in the tap mount portion Cb of the circuit substrate C, which upwardly protrudes in the third axis Z3, and may be formed at an approximately same height as a height of the bus bar 150 arranged on the battery cells B. The connection tap T may be electrically connected to the circuit substrate C and may transfer the voltage information of the battery cells B to the circuit substrate C. According to some embodiments, the connection tap T may include a fixed surface Ta coupled to the first surface C1 or the second surface C2 of the circuit substrate C and a coupling surface Tb contacting the fixed surface Ta through an edge and forming an uppermost surface in the third axis Z3. According to some embodiments, the fixed surface Ta of the connection tap T may be coupled to the second surface C2 of the circuit substrate C, and for example, may be fixed to the second surface C2 of the circuit substrate C by soldering, etc. A connection member for detection may be bonded to the coupling surface Tb of the connection tap T. According to some embodiments, the connection tap T may be formed as a rectangular metal block having the fixed surface Ta and the coupling surface Tb contacting each other at an edge and may be formed as the rectangular metal block having the third axis Z3 as a long axis. For example, the connection tap T may be formed as a rectangular nickel block. According to some embodiments, the connection tap T may be formed as a metal thin plate having a bent structure, for example, a nickel plate having a bent structure. Here, the connection tap T may include the fixed surface Ta coupled to the first surface C1 or the second surface C2 of the circuit substrate C and the coupling surface Tb bent from the fixed surface Ta and extending toward the first or second battery cells B2.

The connection tap T of the circuit substrate C may be electrically connected to the bus bar 150 forming the parallel module PM. That is, a connection member for detection mediating an electrical connection between the connection tap T and the bus bar 150 may be formed between the connection tap T and the bus bar 150. The connection member for detection may include an end bonded to the connection tap T and the other end bonded to the bus bar 150 and may extend in a suspension state between the end and the other end bonded by wire bonding to the connection tap T and the bus bar 150, respectively. For example, the connection member for detection may be bonded to a detection side 155 extending across the circuit substrate C in the bus bar 150 extending in the second axis Z2. For example, the detection side 155 of the bus bar 150 may be formed to have a relatively greater width than the contact sides 151 and 152 and the connection side 154 of the bus bar 150. Here, the detection side 155 of the bus bar 150 may provide a contact location with the connection tap T, and at the same time, together with the connection side 154 of the bus bar 150, may connect the contact sides 151 and 152 of the bus bar 150 with each other.

According to some embodiments, by detecting a voltage of the bus bar 150, a voltage of the battery cells B connected in parallel with each other through the bus bar 150 may be measured. According to some embodiments, the connection member for detection may be formed to be parallel between the bus bar 150 and the connection tap T, and through two or more connection members for detection formed to be parallel with each other between the bus bar 150 and the connection tap T, even when any one connection member for detection is disconnected, the electrical connection between the bus bar 150 and the connection tap T may be maintained. A plurality of connection taps T may be formed in the first axis Z1 in which the circuit substrate C extends, and through the plurality of connection taps T arranged in the first axis Z1, the circuit substrate C may be electrically connected to each bus bar 150 forming the parallel module PM.

The circuit substrate C may be arranged between the first and second battery cells B1 and B2 in a standing state (e.g., such that a primary or largest plane of the circuit substrate C extends in a direction parallel to the direction that the battery cells B1 and B2 extend). For example, the circuit substrate C may be arranged in the standing state in the third axis Z3 corresponding to a longitudinal direction of the first and second battery cells B1 and B2. For example, the circuit substrate C may be arranged in the standing state such that the first and second surfaces C1 and C2 of the circuit substrate C that are opposite to each other may face the first and second battery cells B1 and B2, respectively. As described above, because the circuit substrate C may be arranged in the standing state between the first and second battery cells B1 and B2, rather than a lying state, a space occupied by the circuit substrate C may be relatively reduced, and the electrical connection between the circuit substrate C and the bus bar 150 may be relatively easily formed by the connection tap T of the circuit substrate C. For example, because the circuit substrate C may be arranged in the standing state, the connection tap T formed in the tap mount portion Cb of the circuit substrate C and upwardly protruding in the third axis Z3 may be formed at the approximately same height as the height of the bus bar 150, and the electrical connection between the connection tap T and the bus bar 150 formed at the approximately same height may be easily formed. For example, wire bonding of the connection member for detection mediating the electrical connection between the connection tap T and the bus bar 150 may be easily performed, a length of the connection member for detection may be decreased, and a risk of disconnection may be reduced.

According to some embodiments, the bus bar 150 may be arranged on the upper holder 110a (see FIG. 1), and the connection tap T may be coupled to the circuit substrate C arranged below the upper holder 110a. However, the connection tap T may be formed in the tap mount portion Cb of the circuit substrate C that is exposed to the upper holder 110a through the sensing hole 110s formed in the upper holder 110a, and thus, the connection tap T and the bus bar 150 may be electrically connected to each other.

According to some embodiments, the circuit substrate C may be arranged between the first and second battery cells B1 and B2 and may detect the voltage information of the battery cells B through a connection member for detection bonded to the connection tap T coupled to the first surface C1 or the second surface C2 of the circuit substrate C. However, embodiments according to the present disclosure are not limited thereto. For example, the circuit substrate C may not be arranged between the first and second battery cells B1 and B2. The circuit substrate C may be arranged at a side of the first battery cells B1 and may detect the voltage information of the first battery cells B1 arranged at a side of the circuit substrate C through the connection tap T coupled to the first surface C1 of the circuit substrate C and a connection member for detection bonded to the connection tap T. That is, the battery pack according to various embodiments may not include the arrangement of the first and second battery cells B1 and B2 arranged at both sides of the circuit substrate C, respectively. The battery pack may include only the first battery cells B1 arranged at a side of the circuit substrate C and may not include the second battery cells B2 arranged at the other side of the circuit substrate C.

According to some embodiments, the connection tap T may be coupled to the first surface C1 of the circuit substrate C to have a shape protruding toward the first battery cells B1, and a connection member for detection mediating an electrical connection between the connection tap T and the first battery cells B1 may be formed. For example, the connection member for detection may have an end bonded to the connection tap T and the other end bonded to the bus bar 150 connected to the first battery cells B1 and may electrically connect the connection tap T with the first bus bar 150. Also, according to some embodiments, the circuit substrate C may be arranged in a standing state to face the first battery cells B1. Also, the first battery cells B1 may include the plurality of first battery cells B1 arranged in the second axis Z2 in which the bus bar 150 extends or the second axis Z2 in which the connection tap T protrudes from the first surface C1 of the circuit substrate C, and the plurality of first battery cells B1 arranged in the second axis Z2 may be connected to each other in parallel through the bus bar 150 so as to form the parallel module PM. A plurality of connection taps T arranged in the first axis Z1 may be formed on the circuit substrate C and may detect voltages of different parallel modules PM through the bus bars 150 connected to the different parallel modules PM arranged in the first axis Z1.

Figure 10:
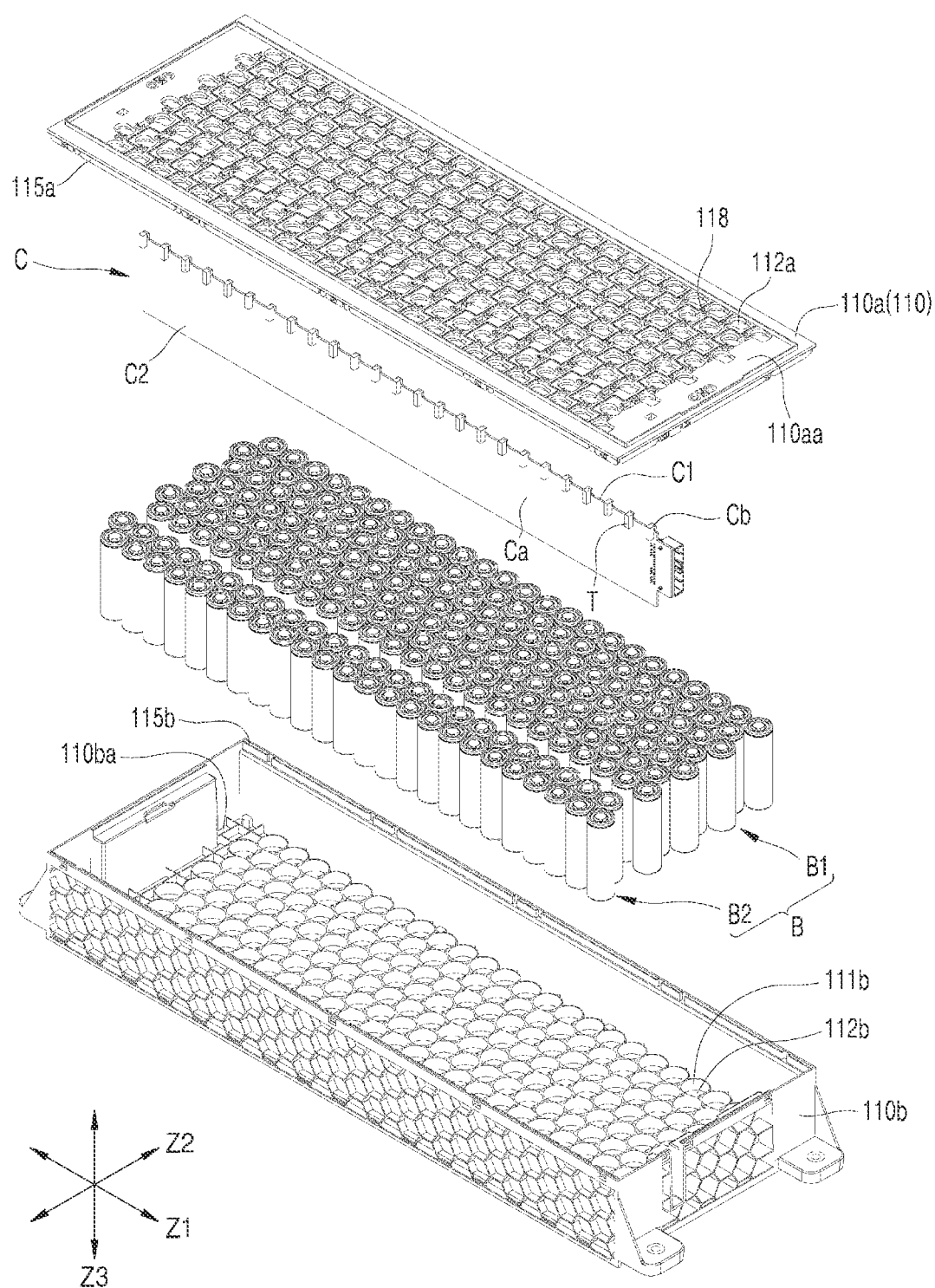
FIG. 10 is an exploded perspective view of an assembled structure of a cell holder, a battery cell, and a circuit substrate illustrated in FIG. 1.
Figure 11:
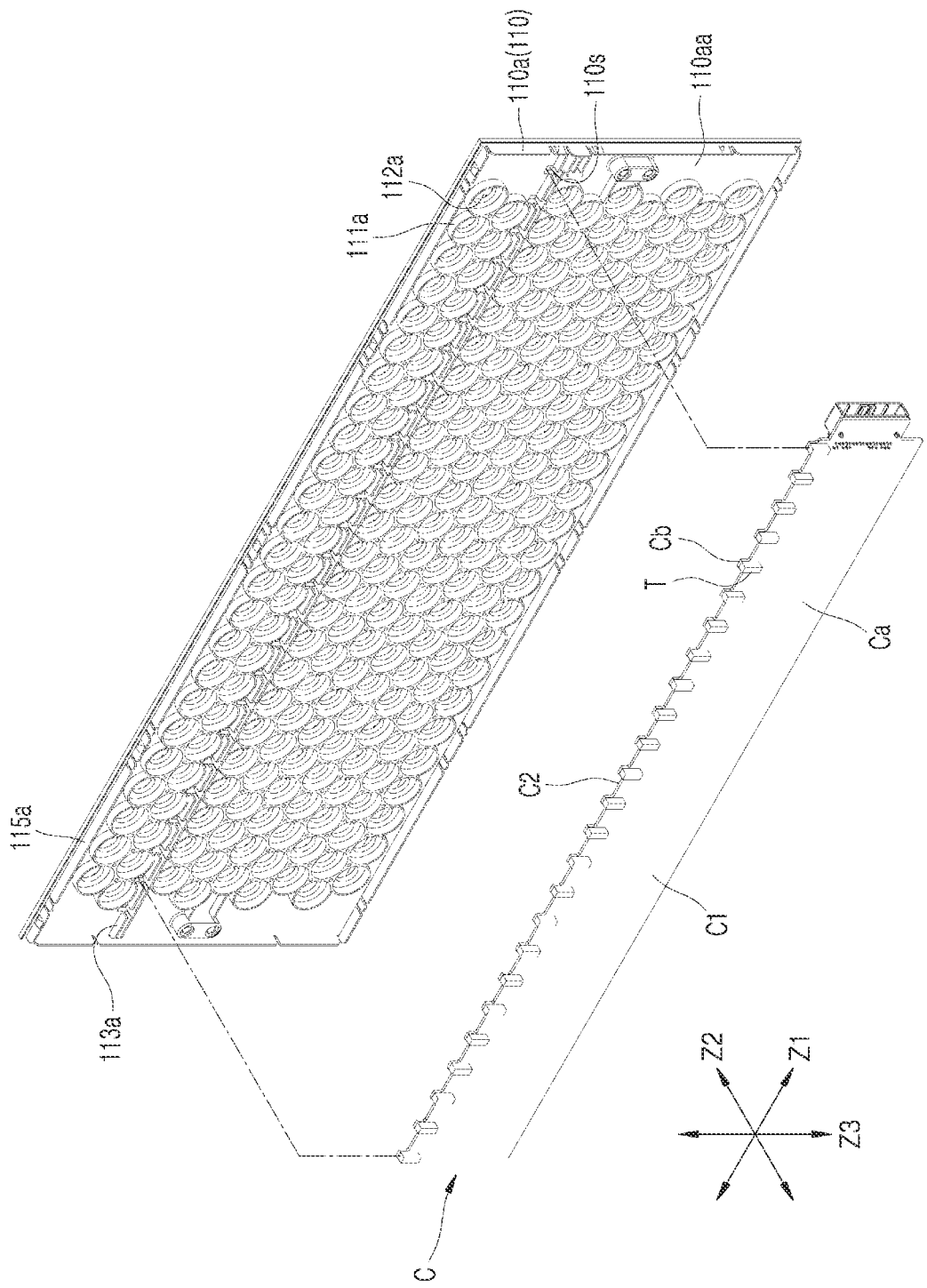
FIG. 11 is an exploded perspective view of an assembled structure of the cell holder and the circuit substrate illustrated in FIG. 1.
Figure 12:
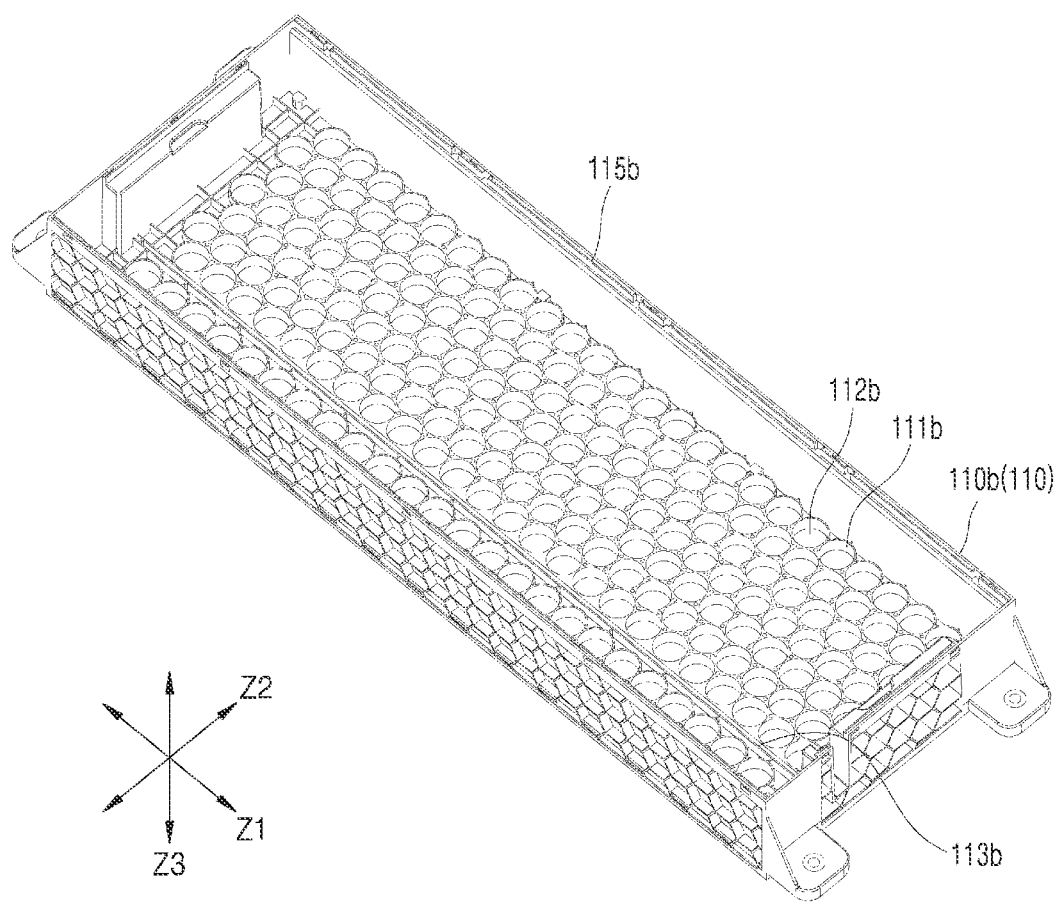
FIG. 12 is a view of a lower holder illustrated in FIG. 1.
Figure 13:
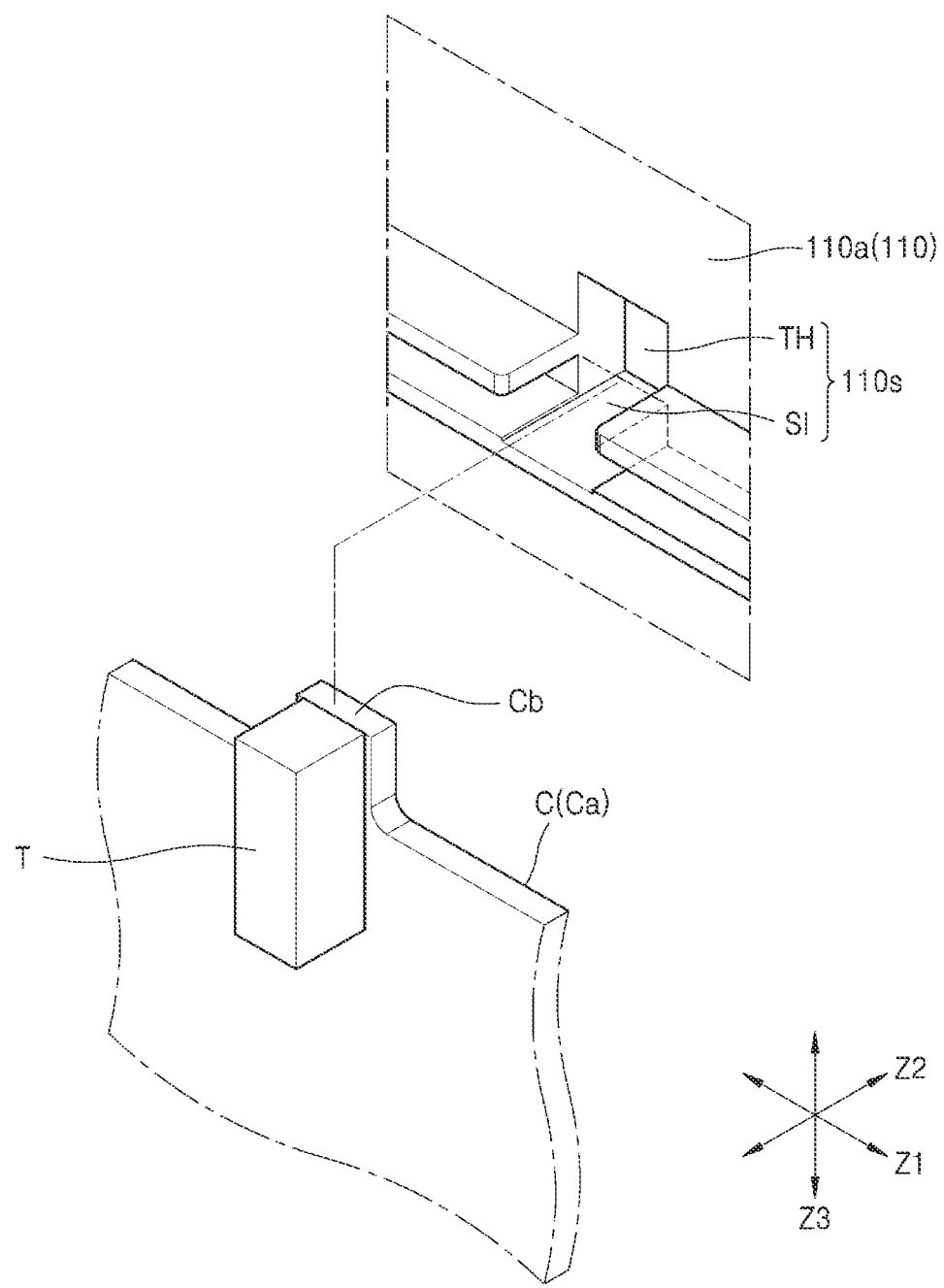
FIG. 13 is a view of a sensing hole of a cell holder.

FIG. 10 is an exploded perspective view of a state in which the cell holder, the battery cell, and the circuit substrate illustrated in FIG. 1 are assembled. FIG. 11 is an exploded perspective view of a state in which the cell holder and the circuit substrate illustrated in FIG. 1 are assembled. FIG. 12 is a view of a lower holder illustrated in FIG. 1. FIG. 13 is a view for describing the sensing hole of the cell holder.

Referring to FIGS. 10 through 13, the battery cells B may be inserted into the cell holder 110 to be assembled, and when the battery cells B may be inserted into the cell holder 110 to be assembled, an assembling location may be defined. For example, the cell holder 110 may include the upper holder 110a into which the upper end portion 10a of the battery cells B is inserted and a lower holder 110b into which the lower end portion 10b of the battery cells B is inserted.

The upper holder 110a may include an upper holder main body 110aa extending across the battery cells B and an upper end portion of the circuit substrate C, an upper cell assembling rib 111a protruding toward the battery cells B from the upper holder main body 110aa and surrounding the upper end portion 10a of the battery cells B, an upper substrate assembling rib 113a protruding toward the circuit substrate C from the upper holder main body 110aa and surrounding the upper end portion of the circuit substrate C, and a terminal hole 112a to expose the first and second electrodes 11 and 12 formed on the upper end portion 10a of the battery cells B.

According to some embodiments, the upper holder main body 110aa may include a plate-shaped member extending across the upper end portion 10a of the battery cells B. As described below, according to some embodiments, most of the accommodation space for accommodating the plurality of battery cells B and the circuit substrate C may be provided by the lower holder 110b, and the upper holder 110a may be coupled to the lower holder 110b to face the lower holder 110b and may close a side of the accommodation space. According to some embodiments, the upper holder 110a may be formed to approximately have a plate shape, and the lower holder 110b may be formed to approximately have a box shape.

The upper cell assembling rib 111a may define the assembling location of the battery cells B by surrounding the upper end portion 10a of the battery cells B, and the terminal hole 112a for exposing the first and second electrodes 11 and 12 formed on the upper end portion 10a of the battery cells B may be formed in the upper cell assembling rib 111a. The first and second electrodes 11 and 12 of the battery cells B exposed through the terminal hole 112a may be connected to the bus bar 150 through the connection member W. In other words, the bus bar 150 may be arranged on the upper holder 110a and may be connected to the first and second electrodes 11 and 12 of the battery cells B exposed through the terminal hole 112a of the upper holder 110a.

The upper cell assembling rib 111a and the terminal hole 112a may be formed in first and second areas of the upper holder 110a, in which the group of first battery cells B1 and the group of second battery cells B2 are respectively arranged, and the upper substrate assembling rib 113a may be formed in a third area in which the circuit substrate C is arranged between the first and second areas. The upper substrate assembling rib 113a may define the assembling location of the circuit substrate C by extending in the first axis Z1 to surround the upper end portion 10a of the circuit substrate C. For example, the upper substrate assembling rib 113a may hold the circuit substrate C at a right location by surrounding a thickness between the first and second surfaces C1 and C2 of the circuit substrate C and may provide a groove into which the thickness of the circuit substrate C is inserted.

According to some embodiments, the circuit substrate C may include the base portion Ca and the tap mount portion Cb upwardly protruding from the base portion Ca in the third axis Z3. For example, the base portion Ca may be inserted and assembled into the upper substrate assembling rib 113 formed on a lower surface of the upper holder 110a so as to have a fixed location, and the tap mount portion Cb may penetrate through the upper holder 110a through the sensing hole 110s of the upper holder 110a so as to have a fixed location. That is, according to some embodiments, the upper substrate assembling rib 113a may hold an upper end portion of the base portion Ca in the circuit substrate C.

The upper substrate assembling rib 113a may be intermittently formed in the first axis Z1, rather than being continually formed in the first axis Z1. For example, the upper substrate assembling rib 113a may be formed to have an intermittent shape through the sensing hole 110s for exposing the tap mount portion Cb in which the connection tap T is mounted in the first axis Z1. Aspects about the sensing hole 110s will be described in more detail below.

According to some embodiments, the first and second areas in which the first and second battery cells B1 and B2 are respectively arranged and the third area in which the circuit substrate C is arranged may be integrally formed at different locations of the upper holder 110a. A plurality of location alignment ribs 118 for aligning the bus bar 150 may be formed on an upper surface of the upper holder 110a. The location alignment rib 118 may extend on the upper surface of the upper holder 110a in the first and second axes Z1 and Z2 to locate the bus bar 150 at a right location. For example, the location alignment rib 118 may prevent the blockage of the first and second electrodes 11 and 12 of the battery cells B that are exposed through the terminal hole 112a due to the misalignment of the bus bar 150.

The lower holder 110b may include a lower holder main body 110ba extending across lower end portions of the battery cell B and the circuit substrate C, a lower cell assembling rib 112b protruding toward the battery cells B from the lower holder main body 110ba and surrounding the lower end portion of the battery cells B, a lower substrate assembling rib 113b protruding toward the circuit substrate C from the lower holder main body 110ba and surrounding the lower end portion of the circuit substrate C, and a cooling hole 112b for exposing at least a portion of the lower end portion of the battery cells B.

According to some embodiments, the lower holder main body 110ba may include a box-shaped member including a surface extending across the lower end portion of the battery cells B. That is, the lower holder 110b may have a box shape and may provide most of the accommodation space for accommodating the plurality of battery cells B and the circuit substrate C, and the upper holder 110a may be arranged to face the lower holder 110b and may close a side of the accommodation space.

The lower cell assembling rib 112b may define an assembling location of the battery cells B by surrounding the lower end portion of the battery cells B, and the cooling hole 112b for exposing the lower end portion 110b of the battery cells B may be formed in the lower cell assembling rib 112b. The cooling hole 112b may expose the lower end portion 10b of the battery cells B and may increase thermal contact between the lower end portion 10b of the battery cells B exposed from the lower holder 110b through the cooling hole 112b and a cooling plate 130 (see FIG. 1) arranged below the lower holder 110b to increase the efficiency of cooling the battery cells B. According to some embodiments, the upper holder 110a and the lower holder 110b may be assembled to face each other with the battery cells B therebetween in the third axis Z3. Also, the cooling plate 130 (see FIG. 1) may be arranged below the lower holder 110b, and a heat transfer sheet 120 for facilitating the heat transfer between the lower end portion 10b of the battery cells B exposed through the cooling hole 112b of the lower holder 110b and the cooling plate 130 may be arranged between the lower holder 110b and the cooling plate 130. A cover 180 (see FIG. 1) may be arranged on the upper holder 110a.

The lower cell assembling rib 112b and the cooling hole 112b may be formed in the first and second areas in which the group of first batteries B1 and the group of second batteries B2 are respectively arranged, in the lower holder 110b, and the lower substrate assembling rib 113b may be formed in the third area in which the circuit substrate C is arranged between the first and second areas. According to some embodiments, the first and second areas in which the first and second battery cells B1 and B2 are respectively arranged and the third area in which the circuit substrate C is arranged may be integrally formed at different locations of the lower holder 110b.

The lower substrate assembling rib 113b may define the assembling location of the circuit substrate C by extending in the first axis Z1 to surround the lower end portion of the circuit substrate C. The upper end portion and the lower end portion of the circuit substrate C may be inserted into the upper substrate assembling rib 113a and the lower substrate assembling rib 113b, respectively, to have fixed locations. That is, the cell holder 110 according to some embodiments may fix not only the location of the battery cell B, but also the location of the circuit substrate C. According to some embodiments, the upper substrate assembling rib 113a and the lower substrate assembling rib 113b may accommodate an adhesive for solidly fixing the location of the circuit substrate C, and through the adhesive, the upper substrate assembling rib 113a and the lower substrate assembling rib 113b, and the upper end and the lower end of the circuit substrate C may be bonded.

According to some embodiments, the upper holder 110a and the lower holder 110b may be formed to have a structure in which the first area in which the group of first battery cells B1 are arranged, the second area in which the group of second battery cells B2 are arranged, and the third area in which the circuit substrate C is arranged are integrally provided. For example, the third area in which the circuit substrate C is arranged may extend in the first axis Z1 across the first area in which the first battery cells B1 are arranged and the second area in which the second battery cells B2 are arranged. The upper holder 110a and the lower holder 110b may be coupled to each other to face each other in the third axis Z3, and an accommodation space for accommodating the group of first battery cells B1, the group of second battery cells B2, and the circuit substrate C may be formed between the upper holder 110a and the lower holder 110b.

An assembled structure between the upper holder 110a and the lower holder 110b may be formed along edges of the upper holder 110a and the lower holder 110b. For example, a holder assembling rib 115a may be formed in any one of the upper holder 110a and the lower holder 110b, and a holder assembling groove 115b into which the holder assembling rib 115a is inserted may be formed in the other of the upper holder 110a and the lower holder 110b. According to some embodiments, an adhesive may be provided between the holder assembling rib 115a and the holder assembling groove 115b formed in the upper holder 110a and the lower holder 110b, to solidly couple the upper holder 110a and the lower holder 110b to each other. For example, while the adhesive is accommodated in the holder assembling groove 115b, the holder assembling rib 115a may be inserted into the holder assembling groove 115b in which the adhesive is accommodated, and thus, the holder assembling groove 115b and the holder assembling rib 115a may be bonded to each other.

Referring to FIG. 13, the sensing hole 110s through which a slit SI for exposing the tap mount portion Cb of the circuit substrate C and a tap hole TH for exposing the connection tap T mounted in the tap mount portion Cb of the circuit substrate C are continually connected to each other may be formed in the upper holder 110a. The sensing hole 110s may expose the connection tap T to allow a connection between the connection tap T and the bus bar 150 and allow a connection between the connection tap T exposed to the upper holder 110a through the sensing hole 110s and the bus bar 150 arranged on the upper holder 110a.

The sensing holes 110s may be intermittently formed to be apart from each other in the first axis Z1 in which the circuit substrate C extends, and the sensing holes 110s may expose the tap mount portions Cb of the circuit substrate C and the connection taps T mounted in the tap mount portions Cb intermittently formed to be apart from each other in the first axis Z1. In other words, the sensing holes 110s may include the slit SI exposing the tap mount portion Cb of the circuit substrate C and the tap hole TH exposing the connection tap T mounted in the tap mount portion Cb of the circuit substrate C, and the slit SI and the tap hole TH may be continually connected to each other.

The slit SI of the sensing hole 110s may be configured to expose the tap mount portion Cb of the circuit substrate C and may be formed in the first axis Z1. Also, the tap hole TH of the sensing hole 110s may be configured to expose the connection tap T formed on the first surface C1 or the second surface C2 of the tap mount portion Cb, and the tap hole TH may extend from the slit SI in the second axis Z2.

The connection tap T exposed through the tap hole TH may be connected to the bus bar 150 through a connection member for detection. The slit SI of the sensing hole 110s may be configured to expose the tap mount portion Cb of the circuit substrate C. Through the slit SI (or the sensing hole 110s), the upper substrate assembling rib 113a supporting the thickness of the circuit substrate C may be disconnected, and through the slit SI, the upper substrate assembling rib 113a may not be continually formed in the first axis Z1 and may be intermittently formed in the first axis Z1 (see FIG. 11).

Referring to FIGS. 10 through 12, the upper holder 110a and the lower holder 110b may be formed to have different heights from each other in the third axis Z3. According to some embodiments, the upper holder 110a may be formed to substantially have a plate shape, and the lower holder 110b may be formed to substantially have a box shape. For example, the accommodation space in which the battery cells B and the circuit substrate C are accommodated together may be provided by the lower holder 110b substantially box-shaped, and the upper holder 110a that is plate-shaped may function as a cover closing the accommodation space of the lower holder 110b. That is, according to some embodiments, the height of the lower holder 110b may be greater than the height of the upper holder 110a.

The upper substrate assembling rib 113a surrounding the upper end portion of the circuit substrate C in the first axis Z1 of the circuit substrate C and the slit SI (or the sensing hole 110s) exposing the upper end portion of the circuit substrate C may be alternately formed in the upper holder 110a (see FIG. 11). According to some embodiments, the base portion Ca and the tap mount portion Cb may be alternately arranged on the upper end portion of the circuit substrate in the first axis Z1, and thus, the upper substrate assembling rib 113a supporting the thickness of the base portion Ca and the slit SI (or the sensing hole 110s) exposing the tap mount portion Cb may be alternately arranged on the upper holder 110a in the first axis Z1.

In other words, the upper substrate assembling rib 113a for fixing the location of the circuit substrate C may be formed on a portion of the upper holder 110a, in which the slit SI is not formed, that is, a portion of the upper holder 110a that covers the upper end portion of the circuit substrate C. The upper holder 110a may expose the upper end portion of the circuit substrate C through the list SI and may allow the connection between the connection tap T coupled to the circuit substrate C and the connection member for detection, and the upper holder 110a may fix the location of the circuit substrate C through the upper substrate assembling rib 113a formed in the portion of the upper holder 110a, the portion covering the upper end portion of the circuit substrate C.

Referring to FIG. 1, according to some embodiments, the bus bar 150 may be fixed on the upper holder 110a. To this end, an adhesive may be injected onto the upper holder 110a, and the bus bar 150 may be mounted on the upper holder 110a, onto which the adhesive is injected, and thus, the bus bar 150 may have the fixed location on an upper surface of the upper holder 110a. In other words, the upper holder 110a and the bus bar 150 may be bonded to each other with the adhesive therebetween.

A potting resin may be filled on the upper holder 110a on which the bus bar 150 is fixed. The potting resin filled on the upper holder 110a may bury the connection member W connected to the bus bar 150, together with the bus bar 150, may fix the location of the connection member W, may prevent a disconnection or a short-circuit due to shifting of the connection member W due to external shocks or vibration, and may insulate the connection member W from an external environment.

According to some embodiments of the present disclosure, a battery pack having a relatively improved connection structure for electrically connecting different battery cells is provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery pack comprising:
    a plurality of battery cells arranged in rows that are parallel with a first axis, wherein the battery cells arranged in the rows adjacent to each other in a second axis crossing the first axis are forwardly or backwardly misaligned with each other with respect to the first axis such that the battery cells of alternating rows are aligned in columns along the second axis; and
    a plurality of bus bars having a zigzag shape and forming a plurality of parallel modules by connecting corresponding ones of the battery cells arranged in the second axis in parallel and the battery cells in each row along the first axis are connected in series,
    wherein a bus bar from among the bus bars that is at an edge comprises:
       a first contact side;
       a second contact side; and
       a third contact side,
          wherein the first contact side, the second contact side, and the third contact side are respectively arranged on and elongated along a first line at a first side of a column of the battery cells, a second line at a central region of the column of the battery cells, and a third line at a second side of the column of the battery cells, that are parallel with the second axis and spaced apart from each other along the first axis, and the first, second, and third contact sides are located at an end region of the bus bar along the second axis, and the third contact side is not located at the central region of the column of the battery cells wherein the first through third lines are sequentially located in the order of a forward location then a backward location with respect to the first axis, and the first through third contact sides are sequentially arranged in the order of the forward location then the backward location with respect to the first axis.

2. The battery pack of claim 1,
    further comprising a connection side extending in the first axis to connect the first and second contact sides with each other.

3. The battery pack of claim 2, wherein the first and second contact sides are alternately arranged with each other in the second axis.

4. The battery pack of claim 2, wherein the first and second contact sides are forwardly or backwardly misaligned with each other between the adjacent parallel modules.

5. The battery pack of claim 1, wherein
    the bus bar including the third contact side is forwardly or backwardly biased toward the third line, and
    the adjacent parallel modules with the bus bar therebetween includes an arrangement of the battery cells having a forwardly or backwardly biased shape toward the third line.

6. The battery pack of claim 1, wherein the bus bar includes the first and second contact sides in the central location of the second axis.

7. The battery pack of claim 1, further comprising a connection member for connecting the battery cells with the bus bar.

8. The battery pack of claim 7, wherein the connection member connects a first electrode and a second electrode of a first parallel module and a second parallel module that are adjacent to each other, the first electrode and the second electrode being different from each other, to the bus bar between the adjacent first and second parallel modules.

9. The battery pack of claim 8, wherein a distance between the first electrode and the bus bar is different from a distance between the second electrode and the bus bar.

10. The battery pack of claim 8, wherein a distance between a first connection point of the connection member, connected to the first electrode, and a central connection point of the connection member, connected to the bus bar, is different from a distance between a second connection point of the connection member, connected to the second electrode, and the central connection point of the connection member, connected to the bus bar.

11. The battery pack of claim 8, wherein the connection member connects the first electrode of the first parallel module to the bus bar and connects the second electrode of the second parallel module to the bus bar.

12. The battery pack of claim 7, wherein the connection member includes:
    first and second connection points forming connections with the adjacent first and second parallel modules, respectively; and
    a central connection point forming a connection with the bus bar between the first and second connection points.

13. The battery pack of claim 12, wherein the first and second connection points and the central connection point are provided by different connection members including a first connection member and a second connection member.

14. The battery pack of claim 13, wherein the central connection point includes:

a first central connection point provided by the first connection member providing the first connection point;

a second central connection point provided by the second connection member providing the second connection point; and the first and second central connection points are not connected to each other by the first and second connection members.

15. The battery pack of claim 12, wherein the first and second connection points and the central connection point are provided by one connection member.

16. The battery pack of claim 15, wherein the central connection point includes a third central connection point through which the one connection member providing the first and second connection points is connected to the bus bar.

17. The battery pack of claim 16, wherein the third central connection point is provided as two or more third central connection points between the first and second connection points.

* * * * *